United States Patent
de Graffenried, Sr.

(10) Patent No.: US 9,284,503 B2
(45) Date of Patent: Mar. 15, 2016

(54) MANUFACTURE OF GAS FROM HYDROGEN-BEARING STARTING MATERIALS

(76) Inventor: Christopher Lawrence de Graffenried, Sr., Mahopac, NY (US)

(*) Notice: Subject to any disclaimer, the term of this patent is extended or adjusted under 35 U.S.C. 154(b) by 330 days.

(21) Appl. No.: 12/106,488

(22) Filed: Apr. 21, 2008

(65) Prior Publication Data

US 2009/0260288 A1    Oct. 22, 2009

(51) Int. Cl.
*C10J 3/00* (2006.01)
*C10J 3/08* (2006.01)
*C10J 3/26* (2006.01)

(52) U.S. Cl.
CPC .... *C10J 3/08* (2013.01); *C10J 3/26* (2013.01); *C10J 2300/0903* (2013.01); *C10J 2300/093* (2013.01); *C10J 2300/0906* (2013.01); *C10J 2300/1238* (2013.01); *Y02E 20/18* (2013.01)

(58) Field of Classification Search
USPC .............. 422/176, 186.03, 186.21; 48/61, 65
See application file for complete search history.

(56) References Cited

U.S. PATENT DOCUMENTS

| | | | | |
|---|---|---|---|---|
| 3,518,062 A * | 6/1970 | Vertes et al. | .................. | 422/159 |
| 4,019,895 A * | 4/1977 | Santen | .......................... | 75/10.22 |
| 4,102,766 A * | 7/1978 | Fey | ................................ | 204/164 |
| 4,105,437 A * | 8/1978 | Liu | ................................ | 75/10.2 |
| 4,115,074 A * | 9/1978 | Yoshida et al. | .................... | 48/95 |
| 4,141,694 A * | 2/1979 | Camacho | .......................... | 48/61 |
| 4,390,772 A * | 6/1983 | Hiratake | .................. | 219/121.51 |
| 4,466,807 A * | 8/1984 | Santen et al. | ................ | 48/197 R |
| 4,504,308 A * | 3/1985 | Rinesch | ........................ | 75/10.19 |
| 4,508,040 A * | 4/1985 | Santen et al. | .................. | 110/347 |
| 4,591,428 A * | 5/1986 | Pronk | ............................ | 208/165 |
| 4,831,944 A * | 5/1989 | Durand et al. | ................. | 110/346 |
| 5,046,144 A * | 9/1991 | Jensen | ..................... | 219/121.36 |
| 5,107,517 A * | 4/1992 | Lauren | ............................ | 373/18 |
| 5,399,829 A * | 3/1995 | Ogilvie | ..................... | 219/121.38 |
| 5,451,738 A * | 9/1995 | Alvi et al. | ................ | 219/121.59 |
| 5,541,386 A * | 7/1996 | Alvi et al. | ................ | 219/121.38 |
| 5,544,597 A * | 8/1996 | Camacho | ....................... | 110/223 |
| 5,634,414 A * | 6/1997 | Camacho | ....................... | 110/346 |
| 5,766,303 A * | 6/1998 | Bitler et al. | ................... | 75/10.19 |
| 5,798,496 A * | 8/1998 | Eckhoff et al. | .......... | 219/121.36 |
| 5,923,698 A * | 7/1999 | Loebner et al. | .................. | 373/82 |
| 5,943,970 A * | 8/1999 | Gonopolsky et al. | ......... | 110/346 |
| 5,958,264 A * | 9/1999 | Tsantrizos et al. | ........ | 219/121.38 |
| 5,992,446 A * | 11/1999 | Tada | .............................. | 137/375 |
| 6,638,396 B1 * | 10/2003 | Hogan | ............................ | 201/13 |
| 7,832,344 B2 * | 11/2010 | Capote et al. | ................. | 110/250 |
| 2004/0251241 A1 * | 12/2004 | Blutke et al. | ............. | 219/121.59 |

* cited by examiner

*Primary Examiner* — Kaity Handal
(74) *Attorney, Agent, or Firm* — Gearhart Law, LLC

(57) ABSTRACT

A plasma array apparatus for processing starting materials is described and taught. The apparatus uses a plasma sheet(s) to heat starting materials in a chamber under low oxygen conditions. This results in a chemical dissociation of the starting materials rather than a burning of the contained materials. Elemental components, such as hydrogen, carbon, and molecules, such as residual hydrocarbons, of the dissociated starting materials can then be separated in such a way as to produce viable amounts of a synthetic gas primarily composed of hydrogen (h-syngas). This is accomplished with a minimal release of harmful byproducts such as carbon dioxide, a greenhouse gas. The apparatus may be used on a variety of starting materials including, but not limited to, natural gas, coal, liquid petroleum products, and a variety of biomass containing products such as biodiesel and bioethanol.

10 Claims, 12 Drawing Sheets

Characteristics: Narrow, focused high temperature plasma reacting region. This small reacting region is not sufficient for the very high volume and mass-flow throughput rate application discussed here; the manufacture of gas from hydrogen-bearing starting materials, e.g., using coal or MSW as a starting material, for electric generation.

PRIOR ART

FIGURE 12

| Why a Large Plasma Reacting Volume is Required | | |
|---|---|---|
| Large Base-Load Power Plant Rating | 1,250 | megawatts (MW) |
| Combined Cycle Unit Heat Rate | 7,000 | Btu/kWh |
| Heat Required | 8,750 | million Btu/hr. |
| Hydrogen Energy in an Example Coal | 2,300 | Btu/lb |
| Coal Processed for Hydrogen Extraction | 3.8 | million lb/hour |
| | 63,000 | lb/minute |
| Large Volume and Mass-Flow Rate Required | 1,050 | lb/second |

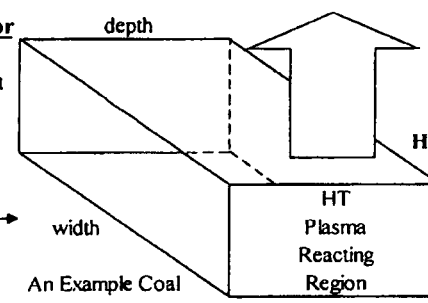

| Example Large Mass-Flow Reactor (one of ten parallel reactors) | | Extract High Volume Manufactured Gas Products | |
|---|---|---|---|
| Feed Starting Materials (e.g., coal) | | $H_2$ | 1,000 cu.ft./sec. |
| | | Gas by-products (cfs): | |
| | | $H_2O$ | 140 |
| | | $NO_x + SO_2$ | 13 |
| | | $CO + CO_2$ | 94 |
| Starting Material | An Example Coal | | |
| Throughput Entry Rate (mass/time) | 105.0 lb/second | | |
| Specific Gravity & Density (lb/ft³) | 1.12 , 70.0 | By-products | lb/sec. |
| Input Starting Materials Rate | 1.5 cu.ft./sec. | Carbon | 65 |
| Input Stream Speed | 0.5 ft/second | Ash | 10 |
| Residence Time in plasma | 3 seconds | Subtotal | 75 |

MANUFACTURE OF GAS FROM HYDROGEN-BEARING STARTING MATERIALS

FIELD OF INVENTION

This invention relates to an apparatus and a process for the ecologically acceptable production of a manufactured gas substantially containing hydrogen from hydrogen-bearing starting materials. Natural gas is the preferred starting material. Other starting materials may include, but may not be limited to, municipal solid waste (MSW), hydrogen containing carbonaceous materials such as petroleum products, biomass, including biofuels derived from biomass, and other hydrogen-bearing starting materials. The plasma array apparatus may be employed to provide heating for thermal dissociation, in combination with other process management technologies, in a partial vacuum or under negative or positive pressure, using a partially to slightly-oxidizing or a non-oxidizing atmosphere.

BACKGROUND OF THE INVENTION

Burning Fossil Fuels

Many believed that the burning of hydrocarbons by humankind has contributed materially to global warming. Life on Earth is part of the natural carbon cycle. The burning of these carbon-rich deposits by humankind has in effect reversed in only a few hundred years the natural sequestration of billions of tons of carbon that had occurred over tens of millions of years, materially altering the natural carbon cycle and the current environment. The re-release of large quantities of sequestered carbon contained in hydrocarbons, specifically the burning and release into the atmosphere as carbon dioxide ($CO_2$), has disturbed the global environment, and may be turning the Earth's environmental clock back to a time and to conditions that predate and could be hostile to the development of humankind. To limit, and even reverse the effects of this Greenhouse gas on the planet, it is highly desirable for humankind to reduce, limit and perhaps, if possible, even eliminate future releases of carbon dioxide ($CO_2$) into the environment from certain sectors of the economy.

That is why this disclosure seeks to promote an apparatus for and a method of hydrogen extraction from hydrogen-bearing materials which minimizes carbon dioxide ($CO_2$) production, i.e., to minimize the re-release of carbon already sequestered in such deposits, and other starting materials. Finally, it is believed that the burning and post-burn capture, compression, transport and re-sequestering of carbon as carbon dioxide ($CO_2$) gas is less desirable, and is likely to be less economical, when all the external environmental risks and consequences are considered, and/or may prove to be technically, geologically, socially and/or politically infeasible for a wide range of applications. Thus, there exists the need for a source of readily available, environmentally friendly energy in the form of hydrogen gas, and for apparatus and a process for the manufacture of gas substantially containing hydrogen from hydrogen-bearing starting materials, that operates cleanly, resolving the foregoing Greenhouse gas-related environmental problems.

DESCRIPTION OF RELATED ART

The disclosed plasma array apparatus (PAA) and method, using the PAA with a specific reactor atmosphere, represent an improvement over prior art. The pre-existing art is listed under References Cited. The following discusses some PAA advantages over this prior art.

Camacho U.S. Pat. No. 4,141,694 discusses the use of individual plasma arcs, with the arc struck between one electrode in a plasma torch with the other electrode being formed from a melt "pool" serving as the second electrode. In Claim 1(c) Camacho discloses that his plasma arc torch is in an electrical circuit with an electrically conductive meltable material (a melt pool) which it relies upon to provide a reactor heat mass for heating the furnace.

The PAA disclosed here represents an improvement over Camacho's disclosure. The PAA does not use individual, separate plasma torches that rely on a melt pool to provide a heat mass for reactor heating. The PAA is a clustered plasma source which creates a 3-dimensional plasma reacting region within the reactor in which the starting material(s) are treated. This allows for many different reactor designs, including a free-falling design, whereby the starting material falls through the plasma reacting region under the influence of gravity. It also allows for alternative reactor designs which do not relying on gravity, whereby for example a gaseous or liquid starting material may be sprayed into the plasma reacting region and through the effects of heat and pressure the resulting synthesis gas may be moved out of the reactor. The Camacho melt pool at the bottom of his reactor is held in place by gravity, constraining the shape and size of his reactor, limiting the location of his plasma torch and limiting his process flexibility. A reactor Camacho goes on to discuss his reactor and reacting atmosphere, which is made up of water in the form of steam. This is not oxygen-free pyrolysis, as it is strictly defined, because of the introduction of utilizing a PAA is free of any such design constraints. oxygen in the form of steam, i.e., steam made up of $H_2O$. The reforming reaction described in Camacho involves splitting water molecules in steam and re-combining the oxygen with carbon in coal to form the undesirable synthesis gas carbon monoxide (CO), along with some hydrogen ($H_2$), and other by-product gases. The precursor carbon monoxide (CO) is burned to form and ultimately releases the undesirable Greenhouse gas carbon dioxide ($CO_2$) to the atmosphere.

The methods disclosed here emphasize the avoidance (or minimizing) of oxygen-containing reactants, such as air, steam, water, and/or oxygen, in order to minimize the production of undesirable byproduct gases in the synthesis gas and to produce an H-syngas which is substantially composed of hydrogen ($H_2$) gas. Camacho says that his preferred starting material is coal. Unlike Camacho; the apparatus and method disclosed here are focused on a range of hydrogen-bearing starting materials with natural gas being the preferred starting material. The objective here is the extraction of H-syngas, which is substantially composed of hydrogen ($H_2$) from hydrogen-baring starting materials. Carbon-containing gases in the synthesis gas in any form are to be avoided to the extent possible.

Hogan U.S. Pat. No. 6,638,396 uses individual plasma torches in separate reactors. The PAA disclosed here uses a multiplicity of clustered plasma sources to form a shaped and sized 3-dimensional plasma reacting region. Hogan's purpose is to "process a waste product." Synthesis gas is a secondary by-product of the waste disposal process according to Hogan. Further, Hogan introduces the reactants "air, steam and/or oxygen." As a result, Hogan's process produces a great many undesirable by-product gases, including CO (carbon monoxide), $CO_2$, (carbon dioxide), N2 (nitrogen gas), $CH_4$ (methane), $H_2S$ (sulfuric acid), HCl (hydrochloric acid), COS_

(carbonyl sulfide), $NH_3$ (ammonia), HCN (hydrogen cyanide), elemental carbon, and other hydrocarbons also containing carbon.

The objective of the apparatus and method disclosed here are to produce a synthetic gas substantially composed of hydrogen; H-syngas. Again, carbon-containing gases in the synthesis gas in any form are to be avoided to the extent possible. Other objectives and advantages will be more fully apparent from the following disclosure and appended claims.

SUMMARY OF THE INVENTION

The named inventions are referred to here as the plasma sheet or PSA, the plasma array or PAA, the plasma cylinder, and plasma hemisphere and plasma sphere, all referred to generally as the plasma array apparatus, PAA, plasma array or simply array. The preferred process for use with the PAA is the large-scale pyrolytic extraction of a manufactured gas called H-syngas substantially containing hydrogen from hydrogen-bearing starting materials in a reactor containing an oxygen-constrained non-stoichiometric reacting atmosphere. However, other atmospheres are not precluded.

BRIEF DESCRIPTION OF THE DRAWINGS

FIG. 12 is a chart detailing the need for a large reacting volume along with example inputs and outputs of such a reactor.

DETAILED DESCRIPTION OF THE INVENTION

Figure 1:
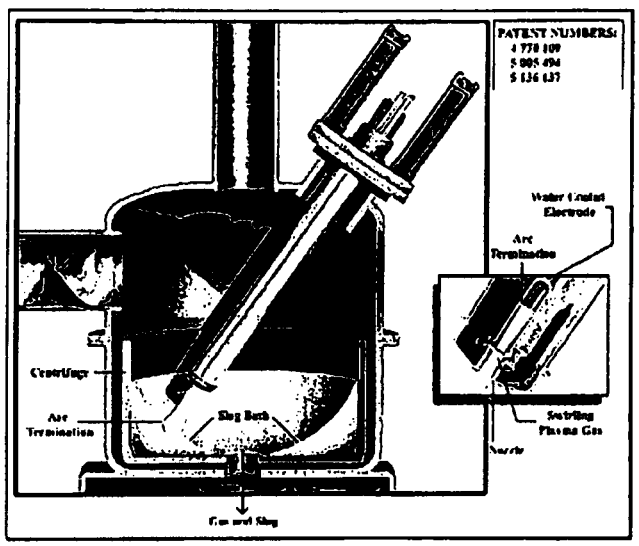
FIG. 1 is an overview of the prior art.

Referring now to FIG. 1, there is a prior art plasma apparatus having a focused reacting region or area.

Improved Method and Designs—

It is an objective of these inventions to provide an improved apparatus to enhance the process for the heating, gasification and dissociation of starting materials. The disclosed inventions allow for heating, gasification and dissociation to occur in a 3-dimensional plasma pyrolysis process (3D3P) region within a reactor operating under an oxygen-constrained non-stoichiometric reacting atmosphere, ensuring optimum performance and the substantial dissociation of the starting materials fed into the system, improving the overall performance of the process.

Disclosed Invention is Different—

The inventions and the method disclosed here are different from other plasma arc torches and from stoichiometric reactors in several important and novel ways. The disclosed invention and methodological differences are described hereinafter.

Simulating a Burner Flame—

In a burner flame, fuel is injected and the air is blown into the furnace and ignited. Typically, the air surrounds the injected fuel plume. The surrounding air and fuel on the outer surface layers of the fuel plume, at the fuel-air interface, are the first to mix and react. Their combustion forms heat, infrared, visible and ultraviolet light, as well as oxidation reaction by-products. Some of this heat and radiation from the outer layers of the flame front travels inward, rapidly heating and dissociating the underlying fuel layers in the plume. In a stoichiometric process, where oxygen is in excess, additional air mixes with the heated dissociating fuel and combustion continues until all the fuel is consumed. However, this traditional combustion process also produces prodigious quantities of the undesirable Greenhouse gas carbon dioxide (CO2).

One objective of the apparatus disclosed here is to simulate the heating and dissociation of fuel which occurs in a flame, but without combustion or the substantial production of carbon dioxide ($CO_2$), using a minimum of input plasma energy. The process is sometimes referred to as pyrolysis; the irreversible thermochemical dissociation of organic compounds at elevated temperatures in the absence of oxygen, or at least in the presence of an oxygen-constrained non-stoichiometric reacting atmosphere. In order to simulate the heating and thermal dissociation of fuel which occurs in a flame, but without actual combustion, a shaped alternate source of pyrolysis energy is disclosed consisting of a plurality of clustered plasma sources called the plasma array apparatus (PAA); i.e., a means for creating a surrounding dissociative energy source similar to that found in a flame. To simulate the heating produced by combustion these plasma sources may be arranged in either an in-line series, a circular ring-shaped or showerhead-type array, in a cylinder, hemispherical or spherical, or segment-like arrangement, surrounding and dissociating the fuel, referred to here as starting materials or feed material. In this way the heated plasmas take the place of the burning outer layers of the fuel plume in combustion. As in a flame, this plasma heating occurs in two broad steps. Initially, infrared, visible light and ultraviolet energy from the plasmas indirectly heat and thermally dissociate feed materials introduced into the reactor. Second, the hot plasmas mix with the incoming feed materials, directly heating and thermally dissociating them by conduction, convection, radiation and through mixing, just as combustion would in a flame. However, the difference here is that the feed materials are not substantially oxidized, because of the low-oxygen, low-water, oxygen-constrained non-stoichiometric atmosphere maintained in the reactor. Other pyrolytic atmospheres are not necessarily precluded.

Two Coordinate Systems—

Two generic plasma array apparatus (PAA) coordinate systems are disclosed hereinafter. One design uses a rectilinear arrangement, i.e., an X-Y matrix of rows and columns, and the other design uses a cylindrical arrangement, i.e., using the cylindrical radius, angle and height coordinates "r," theta (θ) and "z." Spherical and other coordinate systems are not precluded. Different reactor vessel designs suggest different PAA designs. These two generic PAA coordinate system reference designs are reviewed below. Other PAA designs similar in concept, performing an analogous function, may be suggested by other reactor vessel designs, and are also covered by these generic disclosures.

In-Line (in Rectilinear Coordinates)—

Figure 2:
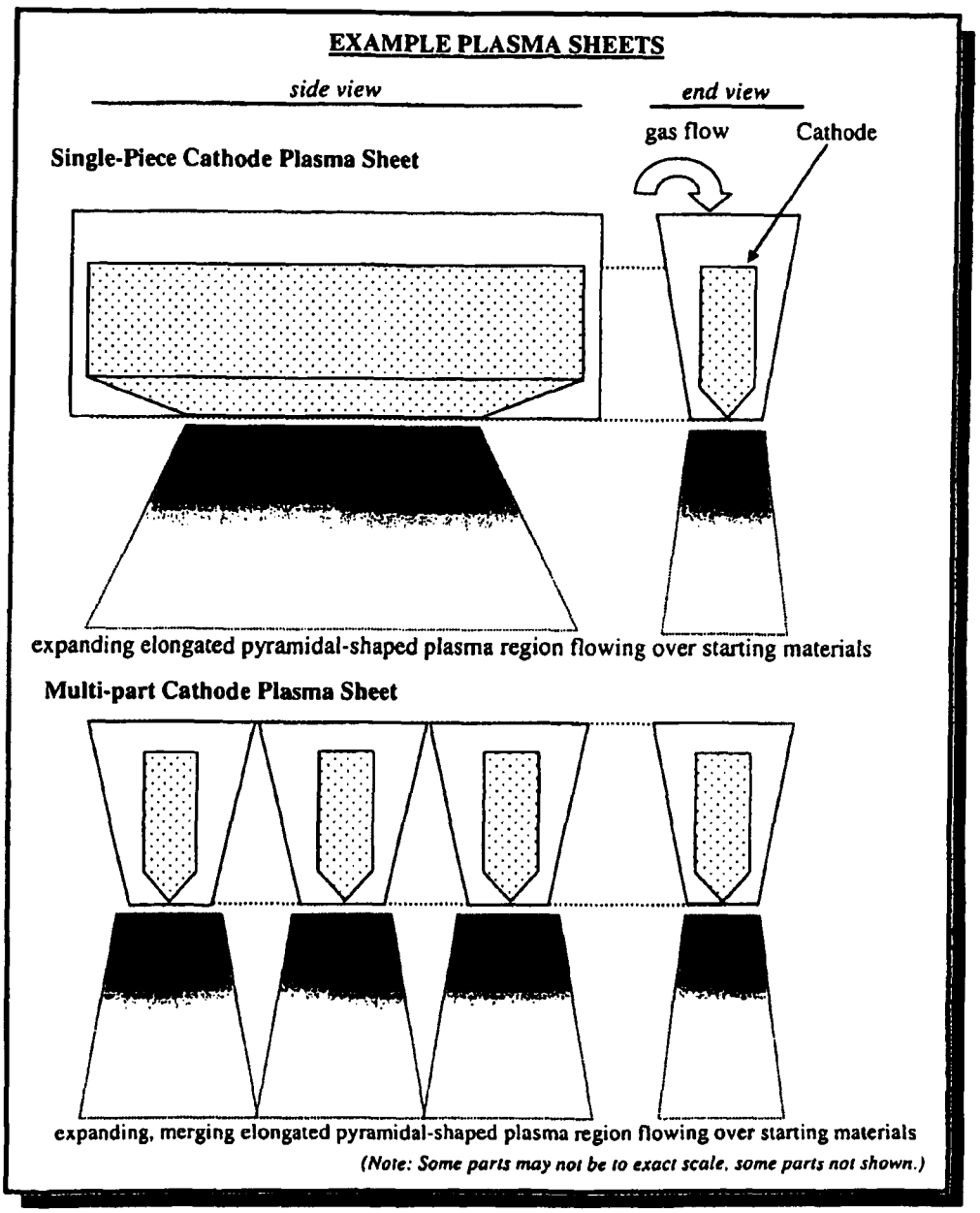
FIG. 2 contains front and side or end views of a rectilinear plasma sheet apparatus or PSA.

FIG. 2 discloses a four-source in-line PAA developed in rectilinear coordinates. It is best suited for a reactor vessel with a rectilinear, rectangular or box-shaped cross section, matching the symmetry of the rectilinear PAA to the cross section of the reactor vessel selected.

Ring-Shaped (in Cylindrical Coordinates)—

Figure 10:
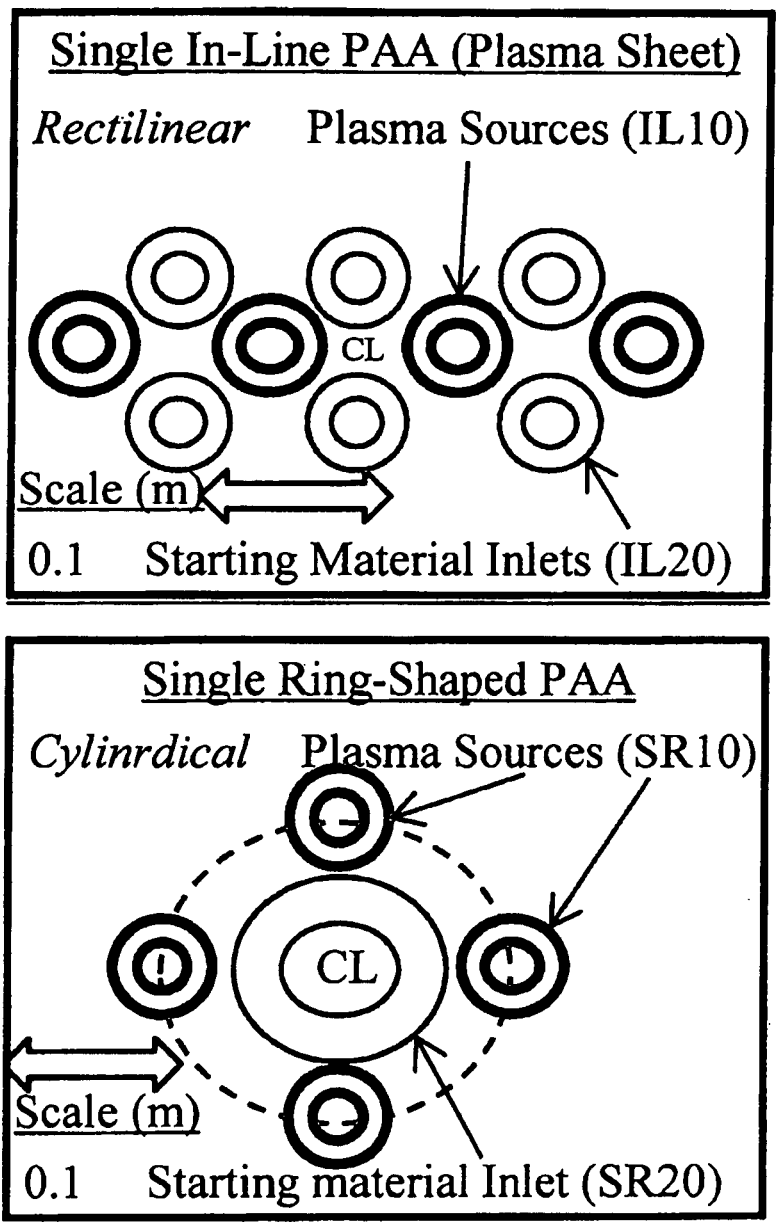
FIG. 10 contains two alternate four-source plasma array apparatus; one in rectilinear coordinates and one in cylindrical coordinates.

FIG. 10 also discloses a second four-source PAA arranged in cylindrical coordinates. It is a ring-shaped "shower-head" type PAA design. The plasma sources are arranged in cylindrical coordinates for use in a reactor vessel with a cylindrical shape, matching the symmetry of the ring-shaped "shower-head" type PAA to the cylindrical shape of the reactor vessel selected.

Single-Unit and Multi-Unit PAA—

The PAA may either be constructed using a single-unit design or using a multi-unit design from a plurality of clustered plasma sources. Both approaches are disclosed below. They both operate like one larger, more flexible plasma source.

Single-Unit PAA—

Figure 7:
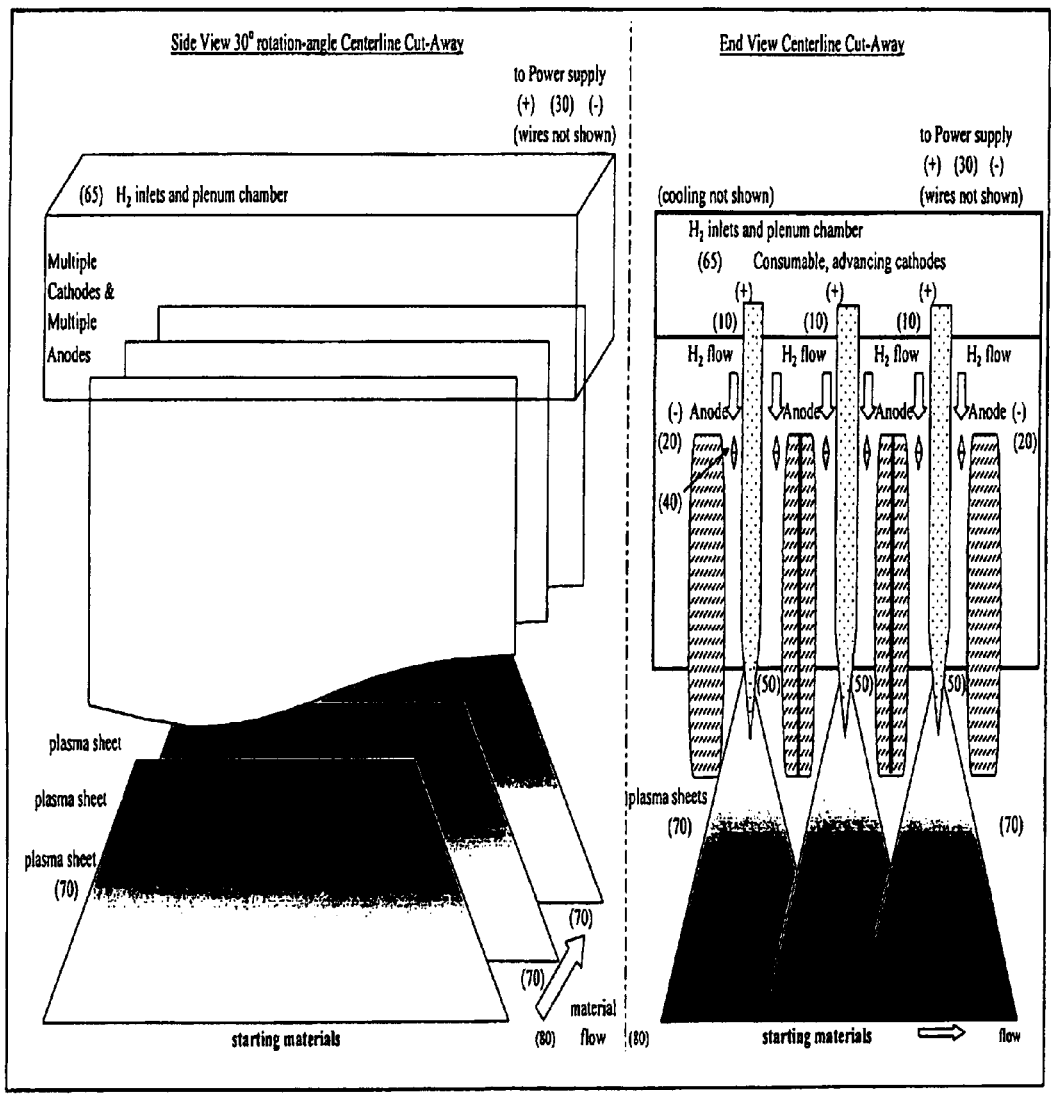
FIG. 7 contains a side and end view of an alternate plasma sheet array.

The PAA designs disclosed in FIGS. 2 and 7 contemplate using four plasma sources constructed and mounted together as a single unit with starting material inlets. Each PAA is designed in its respective coordinate system for its particular associated reactor vessel. In both disclosures the four plasma sources are part of a single-unit PAA. Each of the plasma sources shown in FIGS. 2 and 7 have the same ratings. However, using plasma sources with different ratings is not precluded. In FIGS. 2 and 7 each plasma source has a variable output capability up to 250 kilowatts (kW) at an efficiency of at least 60%. The nominal operating level with all four sources functioning is 50% or 125 kW, for a total output of 500 kW. The rectilinear in-line four-source PAA is intended for a reactor vessel with a rectilinear, rectangular or box-shaped cross section. The ring-shaped "shower-head" type four-source PAA is intended for a reactor vessel with a cylindrical shape. In either case, the single-unit PAA is mounted to the reactor vessel as a single unit and is described further hereinafter. See Table Four-Sources.

each of the four rectilinear, in-line plasma sources. There at (40) the carrier gas may be electrically charged by a high voltage source (not shown).

The carrier gas in FIG. 7 could be hydrogen gas ($H_2$). H-syngas, natural gas and/or other gases which may also be used. Carrier gases containing oxygen, e.g., air, oxygen enriched air, oxygen depleted air, or pure oxygen, may be used, but are generally less desirable. Oxygen in the carrier gas will combine with carbon in the starting materials to form the undesirable Greenhouse gases carbon monoxide (CO) and carbon dioxide ($CO_2$) in the synthetic gas formed. Nitrogen, Argon and other non-reactive gases may be used, but may dilute the manufactured synthetic gas with non-reactive species. Initial and separation costs may be an impediment to their use.

The four plasma sources and their respective anode/cathode electrode pairs are aimed and held in place by a single insulated supporting structure which is in turn mounted on the reactor vessel. A cylindrical hollow anode (20), surrounding a carrier gas passageway running from (40) to (50), and an electrically isolated cathode (10) are depicted. Each of the four electrode pairs are supplied power by a separate variable power supply (30) not shown. The plasma-creating electric arc is formed in the carrier gas at (50). The heated plasmas formed at (50) exit the PAA, spread and merge at (70).

Single-Unit Ring-Shaped PAA—

Figure 11:
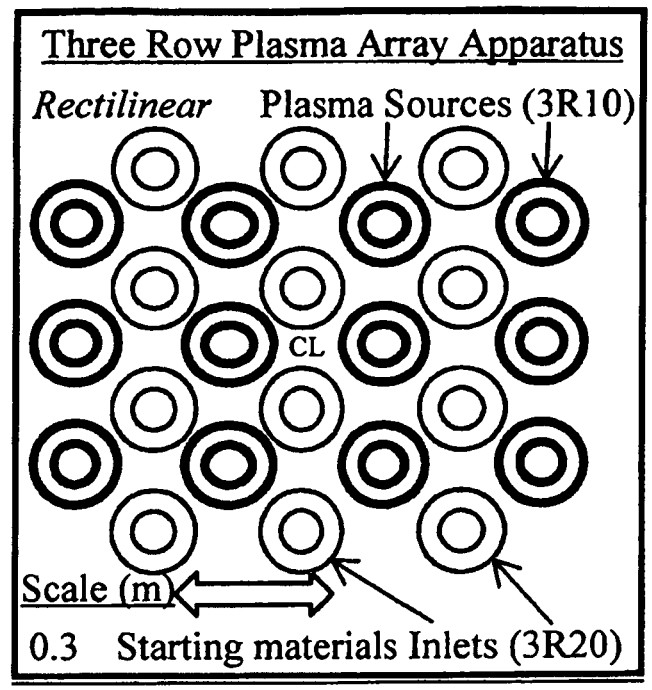
FIG. 11 contains two alternate twelve-source plasma array apparatus; one in rectilinear coordinates and one in cylindrical coordinates.
Figure 11:
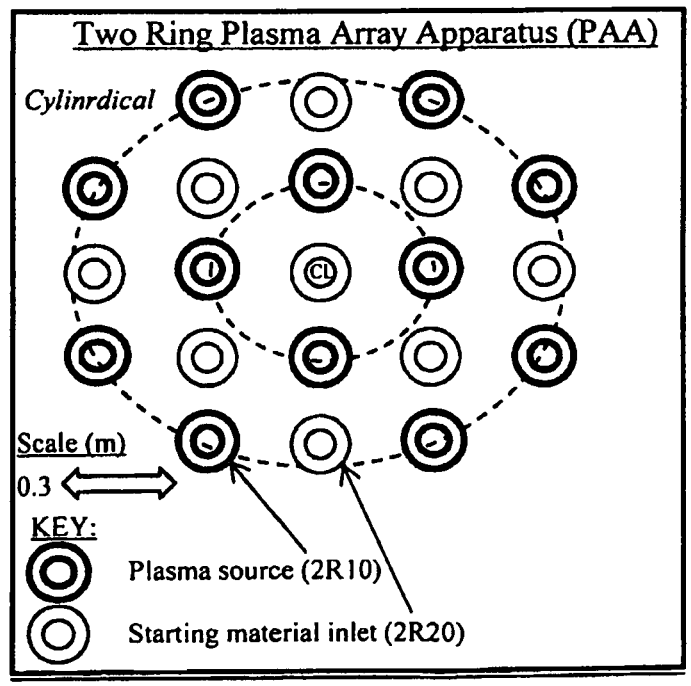

The inlets from a ring-shaped "shower-head" type PAA shown in FIGS. 10 and 11 are oriented in cylindrical coordinates. The ring-shaped "shower-head" type PAA also uses a similar single-unit design, with its plasma sources and starting material inlets oriented in cylindrical coordinates. It also may employ a single plenum. However, multiple plenums are not precluded. The objective of this design, and that of all PAA designs, is to scale and shape the PAA plasmas and the resulting three-dimensional plasma reacting region (PRR) to best suit the reactor vessel design and syngas process objectives selected by the operator. This PAA scaling and shaping helps conform the PRR flow in the reactor vessel to the cross sectional shape employed (e.g., rectilinear or cylindrical). This may allow the operator to manage reactor vessel wall stresses and heating losses better. It may also facilitates attainment of the operator's syngas process objectives, such as the desired residence time, controlling the various reaction

TABLE

| | Four-Sources Plasma Array Apparatus | |
|---|---|---|
| Design Measures | Each Plasma Source | Combined Plasma Sources |
| Plasma Source Power (kW-gross) | Up to 250 | Up to 1,000 |
| Number of Sources | 1 | 4 |
| Type | AC Non-transfer | AC Non-transfer |
| Current (Amps) | Up to 550 | Up to 2,200 |
| Voltage (Volts) | 550 | 550 |
| Plasma Carrier Gases | H2, H-Syngas, Natural Gas | H2, H-Syngas, Natural Gas |
| Carrier Gas (kg/hr) | ~70 | ~280 |
| Typical Plasma Temperature | ~7,040° C. | ~7,040° C. |
| Inter-source Spacing (m) | — | ~0.1 |

Single-Unit In-Line PAA—

Figure 3:
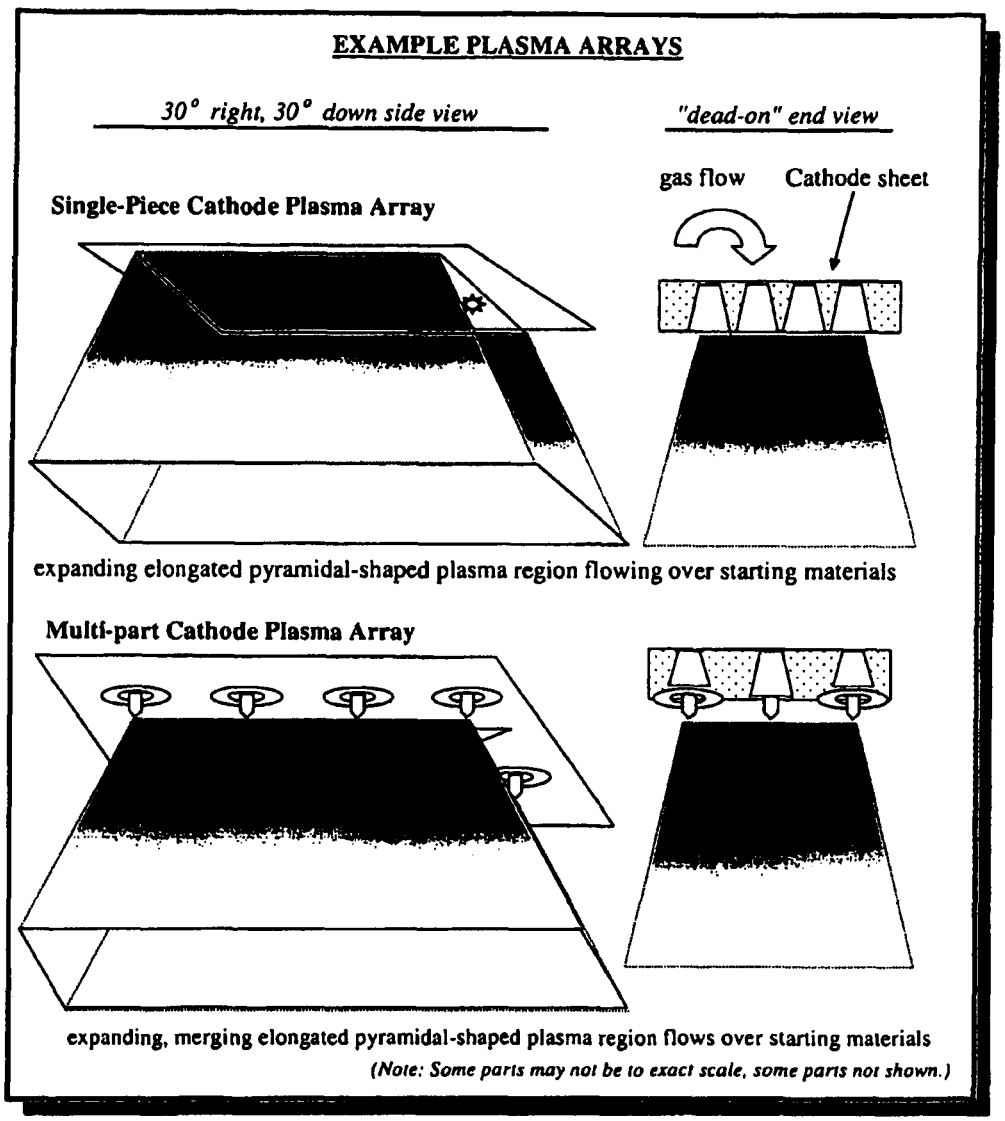
FIG. 3 contains front and side or end view of a rectilinear plasma array apparatus or PAA.
Figure 6:
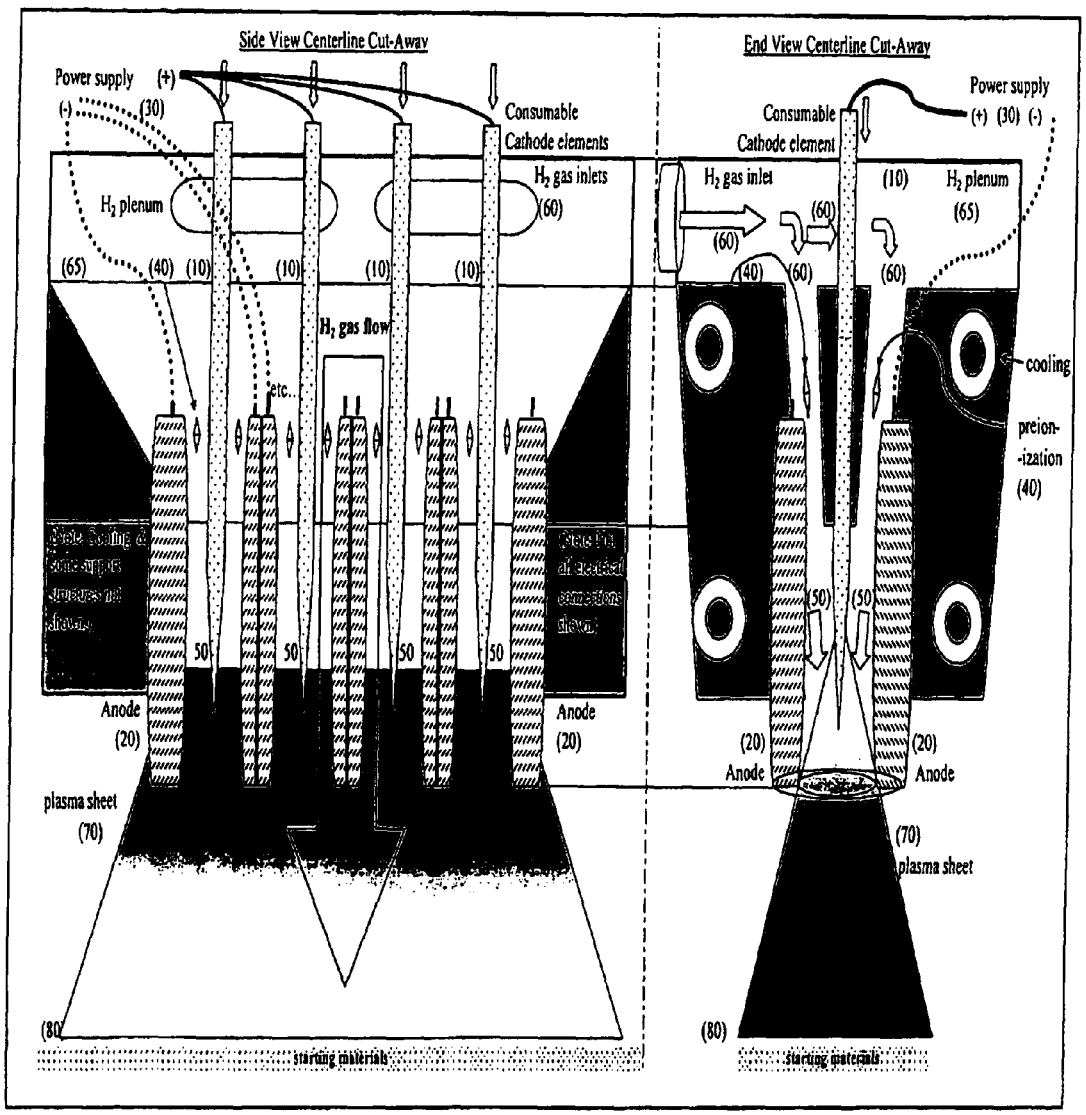
FIG. 6 contains a side and end view of a plasma sheet array.

In FIG. 3 or 6, carrier gas flows into the single common upper plenum (65) through gas inlets (60). However, the use of multiple plenums is not precluded. Optional flow control devices are not shown. The carrier gas spreads out in the plenum and flows to the four pre-ionization areas (40) above sets, meeting the targeted syngas production rate, and sustaining the desired reaction product mixture.

Multi-Unit PAA—

The four-source in-line and ring-shaped "shower-head" type PAA shown in FIGS. 1 and 6 may also be constructed of multi-unit, clustered plasma sources and starting material inlets. In this alternate disclosed embodiment all the clustered plasma sources are also of the same rating. However, using plasma sources of different ratings is not precluded. In the multi-unit PAA the plasma sources are separate, clustered plasma sources, individually mounted to the reactor vessel. They may be arranged in either a clustered rectilinear or a cylindrical ring-shaped "shower-head" type arrangement. As was previously disclosed for the single-unit PAA, each of the individual, clustered plasma sources has a variable output capability up to 250 kW. The nominal operating level with all four sources functioning is 50% or 125 kW, for a total output of 500 kW. The in-line four-source PAA is intended for a reactor vessel with a rectilinear, rectangular or box-shaped cross section. The ring-shaped "shower-head" type four-source PAA is intended for a reactor vessel with a cylindrical shape. In either case, the multiple plasma sources and the associated starting material inlets of the multi-unit PAA are mounted together clustered on one part of the reactor vessel, e.g., the top, which mountings generally span a fraction of the vessel's interior surface area. The multiple plasma sources operate together in a manner similar to that of the single-unit PAA design. See Table Four-Sources.

Full and Partial Operation—

Using an optional nominal operating power level lower in the plasma source capability range extends the plasma source operating life, increasing the time between required maintenance cycles. Both these four-source PAA designs, either rectilinear or cylindrical, provide that improved operating reliability and flexibility. They operate as if they were one larger, longer-lived, variable plasma source. However, these particular four-source PAA designs are intended to allow for continued operation, even when one or two of the plasma sources are rendered inoperable; i.e., outages representing one-quarter (25%) and one-half (50%) of the total nominal plasma source power. For example, if one plasma source is rendered inoperable, then the operator may increase the output of the remaining three plasma sources from 50% to 67%, and the PAA and reactor may continue to operate. Should a second plasma source be rendered inoperable, the operator may ramp up the remaining two plasma sources to their maximum output level of 100% each, so the PAA and reactor may still continue to operate. This same approach and the associated increase in flexibility and improved operating reliability may also be afforded to other PAA designs.

Impact on Production—

The disclosed PAA designs may contribute materially to overall reactor and process availability, reliability and capacity factor. This in turn increases total syngas production. For example, the four-source PAA designs above may allow for up to a 25% longer operating period between major maintenance intervals. And, for the quick-change, single-unit design, PAA maintenance intervals may be considerably shorter than those typical for a conventional two-torch design. It is estimated that a typical production capacity factor may increase by 15% using the quick-change, single-unit PAA design over conventional two-torch designs.

Start-Up, Operation and Shutdown—

The reactor vessel and related components are subject to thermal stresses when they are temperature cycled, especially if heated or cooled too rapidly. Using multiple, flexible plasma sources allows the operator to select gradual start-up heating and shutdown cooling sequences to minimize reactor vessel and component thermal stresses. These four-source PAA designs allow the operator to bring the plasma sources on-line and up in power, or down in power and off-line gradually to minimize reactor vessel and component thermal stresses. The reactor plasma power and starting material input rates may both be varied over a wide range.

A lower minimum power input level may be achieved when compared with typical conventional two-torch designs. That is, 2.5% to 10% of maximum power may be achieved operating one to four plasma sources at minimum output. The nominal four-source operating power output is about 500 kW. However, added total power of up to 1,000 kW (200% of the nominal operating power level) may be achievable for periods of time, subject to any reactor vessel and other components limitations. For normal operation the operator may specify any plasma power level which is accommodated by the combination of one to four plasma source power ranges, i.e., by adjusting both the number of plasma sources engaged (e.g., 1, 2, 3 or 4 plasma sources "on") and, for each plasma source, by selecting a specific power output level (e.g., 10% to 100%). Flexibility is also provided to shape the plasma output across the in-line PAA or around the ring-shaped PAA.

A typical start-up sequence may commence with reactor 'heat-up' using one or more plasma sources operating at low power. Once the reactor is up to nominal operating temperature, the operator may commence synthetic gas production at a low level, introducing a minimum amount of starting materials, e.g., 2.5% to 10% of feed material injector capability. The reactor temperature and minimum production rate may then be stabilized. Finally, the operator may ramp up both plasma source power and starting material inputs, thereby increasing syngas production to the desired output level. Load following, adjusting syngas output to match an external demand, may also be accommodated using these variable PAA designs.

An interruption of starting material flow could trip other systems. However, by using multiple variable plasma sources, the operator has the option of placing the system in low-power standby mode. One or more sources may be operated at minimum output. Standby operation allows the operator to maintain reactor vessel temperature while "idling" at zero starting material input. Finally, as the operator brings the reactor down for maintenance, gradually powering back on the plasma sources allows for a more prolonged cool-down phase, reducing reactor vessel thermal stresses, as the operator prepares the system to enter a maintenance phase.

Quick Change Maintenance—

So far, many of the multi-source advantages discussed have been available to both the single-unit and the multi-unit, clustered PAA designs. However, whenever plasma source replacement and maintenance is required, the single-unit design can provide an additional advantage over a conventional two-torch design.

The single-unit PAA may be removed and replaced in whole, as a single unit. The operator may maintain a working spare single-unit PAA. The maintenance personnel may then exchange, i.e., swap-out, these two single-unit PAA's and the replacement can occur quickly. Operation may be restored promptly. The removed single-unit PAA may then be maintained off-line, off the critical production path. Production is not delayed awaiting its repair.

For quick change-out, the PAA is disconnected from its power, cooling, starting material and carrier gas supplies, and disconnected from the reactor vessel mounting. The replacement single-unit PAA is then installed, connecting it to the reactor vessel mounting, the power, cooling, starting material and carrier gas supplies. The reactor is then quickly readied for testing and heat-up, prior to the prompt restart of syngas production.

Alternatively, for all typical conventional individually-mounted plasma torch designs, each torch must be individually removed, maintained and re-installed. It is believed that the quick-change capability of the single-unit PAA design is superior to all other approaches from these important maintenance, system reliability, availability, and production capacity factor perspectives.

For all the designs disclosed above, the PAA is assumed to be mounted at the top of the reactor vessel. However, other mounting locations are not precluded. The following discussion presents several cases employing variations of the PAA designed to achieve different H-syngas output objectives with different starting materials.

Natural Gas as a Starting Material

FIGS. 2 and 6 present the four-source, in-line and single-ring "shower-head" type arrangements. In this case, either the single-unit or the multi-unit, clustered plasma source design may be used to form a PAA and create a three-dimensional plasma reacting region. The following data is for the Smaller Natural Gas-fed PAA identified in the Table SNG, with an H-Syngas output objective of 250 kg/hr. However, other starting materials and syngas production objectives are not precluded. (Also see Tables LNG and LC).

at the top of a cylindrical reactor vessel. The single-unit PAA is bolted to the cylindrical reactor vessel using a circular flange mounting and a high temperature gasket. The plasmas sources work together as a single unit to create a three-dimensional, merged, donut shaped plasma reacting region, simulating a combustion flame, surrounding and merging with the emerging starting material.

Plasma Sources—

The plasma source specifications identified above are for a plasma torch sold by High Temperature Technologies, Inc., Chateauguay, Quebec, Canada, or a similar device.

Cylindrical Coordinates—

The plasma sources are located at the same radius "r," equidistant from the reactor vessel centerline, and are uniformly spaced in cylindrical coordinates around the centerline ("CL") where it intersects the top of the reactor vessel. In this case, the value of "r" from the reactor vessel centerline to each plasma source is ~0.1 meters. The plasma source angular

TABLE SNG

Smaller Natural Gas-Fed Plasma Array Apparatus Embodiment

Plasma Array Apparatus

| Design Measures | Each Plasma Sources | Combined Plasma Sources |
|---|---|---|
| Plasma Source Power (kW-gross) | Up to 250 | Up to 1,000 |
| Number of Sources | 1 | 4 |
| Type = | AC Non-transfer | AC Non-transfer |
| Current (Amps) | Up to 550 | Up to 2,200 |
| Voltage (Volts) | 550 | 550 |
| Plasma Carrier Gas | H2, H-Syngas, Natural Gas | H2, H-Syngas, Natural Gas |
| Carrier Gas (kg/hr) | ~70 | ~280 |
| Typical Plasma Temperature | ~7,040° C. | ~7,040° C. |
| Inter-source Spacing (m)- | | ~0.1 |

Starting Material

| Attributes | Description | Comments |
|---|---|---|
| Starting Material Type | Natural Gas | Pipeline quality |
| Predominant Chemical Species | Methane (CH4) | C(12 AMU) + 4 * H (1 AMU) = 16 |
| Pre-Heat Temperature | ~300° C. | To lower per unit plasma energy |
| Moisture Content | <<1% | Extremely dry |
| Input Feed Rate (kg/hr) | Up to 1,000 | Up to 2,200 lbs/hr |
| Per Unit Energy Input (kW/kg) | ~0.5 | — |
| Total Energy Inputs (kW-net) | ~550 | — |
| H-Syngas Output Rate (kg/hr) | Up to 250 | — |

Reactor Vessel

| Attributes | Description | Comments |
|---|---|---|
| Nominal Operating Pressure | ~1 ATM | Atmospheric |
| Nominal Operating Temperature | ~1,501° C. | Steady-state temperature |
| Vessel Radius (m) | 0.45 | 3 ft. diameter |
| Vessel Height (m) | 3.3 | 10 ft. |
| Vessel Active Volume (m³) | 2.1 | 75 cu. ft. |
| Residence Time (seconds) | Up to ~3.3 | As required by the starting material |
| H-Syngas Output (m³/hr) @ NTP | Up to 2,800 | Up to 0.8 cu. m/s |

Some Alternative Designs—

The plasma sources identified above are mounted together as a single-unit PAA affixed to the top of the reactor vessel. However, other arrangements and mounting locations are not precluded. In this case, the operator could use either a single-unit PAA, or a multi-unit, clustered plasma source PAA.

Case Description—

The Smaller Natural Gas case (Table SNG) uses 4 plasma sources in a single-unit PAA design with a single ring-shaped "shower-head" type plasma source arrangement (see FIG. 11), centered on a central starting material inlet, and mounted displacements for the angular dimension theta (θ) are 0, 90, 180 and 270 degrees around the reactor vessel centerline.

Aiming and Canting—

Some or all of the plasma sources and the starting material inlet may be angled off of the perpendicular. The plasma sources may be aimed by canting each around the ring, e.g., 5 to 45 degrees from the PAA vertical "z" dimension, in a coordinated fashion to help drive a helical vortex movement of reacting plasmas and starting materials within the cylindrical reactor vessel. The plasma sources may also be canted otherwise, e.g., radially inward toward the starting material inlet and the reactor vessel centerline 5 to 30 degrees from vertical, to promote mixing with the entering starting materials. In this case, each plasma source in the ring is aimed by canting it inward 10 degrees and around the ring in theta ($\theta$) by 30 degrees from vertical to initiate, promote and support a helical vortex motion in the PRR.

Starting Material Inlet—

The single starting material inlet is centered on this same reactor vessel centerline ("CL") at the top center of the cylindrical reactor vessel. The entering starting material is surrounded by and merges with the adjacent, emerging plasma sources. The starting material inlet may employ angled flow fins to deflect, spread and/or rotate the incoming starting materials, further supporting mixing and the helical vortex movement of the reacting plasmas and starting material within the three-dimensional plasma reacting region. This optional helical vortex movement may help increase mixing, reaction product path length and residence time, so as to meet the operator's process parameters. In this case, X-shaped inlet fins centered on the starting material inlet, angled 30 degrees from the PAA vertical "z" dimension and aimed in the same direction as the plasma sources are contemplated to support a helical vortex motion in the PRR.

Syngas Mix—

The plasma sources and starting materials emerge from their respective inlets and merge into a single heated three-dimensional plasma reacting region. Therein, the starting materials thermally dissociate into a mixture of hydrogen gas, elemental carbon and other products, depending on the nominal operating temperature selected by the operator. The objective is to dissociate starting materials, e.g., fossil fuels and dry bio-fuels, into hydrogen gas and other by-products, removing substantial carbon in order to produce a synthetic gas substantially composed of hydrogen ("H-syngas").

Two Temperature Ranges—

The interaction between the plasmas and starting materials, and the competition between the formation of various reaction products in the PRR at different temperatures is complex. For thermal dissociation the average PRR temperature employed will ultimately be determined by a combination of the system design, the operator's targeted product mix and production economics. Two different reaction sets and product mix sets predominate in two temperature ranges: a lower temperature range and a higher temperature range.

Lower Temperature Range—

For natural gas, up to approximately 2,000° K (1,727° C.) Methane is increasingly dissociated into hydrogen gas ($H_2$) and elemental carbon forming carbon black. However, above this temperature diminishing returns are evident. A competing reaction may also produce some Acetylene ($C_2H_2$), which dissociates at higher and lower temperatures. At approximately 2,500° K (2,227° C.) hydrogen gas ($H_2$) formation peaks. At this temperature approximately three-quarters or 75% of the hydrogen and carbon in natural gas are dissociated into the elemental forms: hydrogen gas ($H_2$) and elemental carbon in the form of carbon black. These are the predominant thermal dissociation reactions in this lower temperature range.

Higher Temperature Range—

At temperatures above 2,500° K (2,227° C.), all the Methane has been dissociated into hydrogen gas ($H_2$), elemental carbon, Acetylene ($C_2H_2$) and other hydrocarbons. Thus, in this higher temperature range different thermal dissociation reactions predominate. Acetylene ($C_2H_2$) formed from the natural gas is dissociated into monatomic hydrogen (H) and the unstable $C_2H^+$ radical. At 3,800° K (3,527° C.) substantial hydrogen gas ($H_2$) is dissociated into monatomic hydrogen (H), while Acetylene ($C_2H_2$) and the unstable $C_2H^+$ radical are also dissociated into monatomic hydrogen (H) and carbon soot (e.g., C2 and $C_3$) and carbon gas ($C_g$). These are the predominant thermal dissociation reactions in this higher temperature range. The Reaction Product Mix table below shows this range of outcomes vs. temperature.

| Reaction Product Mix vs. Average PRR Temperature | | | | | | | |
|---|---|---|---|---|---|---|---|
| Average PRR Temp. (° K.) | 1,774 | 1,887 | 2,000 | 2,500 | 3,148 | 3,800 | 5,000 |
| Average PRR Temp. (° C.) | 1,501 | 1,614 | 1,727 | 2,227 | 2,875 | 3,527 | 4,727 |
| Hydrogen (H) in Mix (Mol | 65% | 70% | 72% | 75% | 79% | 89% | 100% |
| H in $C_2H_2$, $C_2H$ and Other | 19% | 23% | 25% | 25% | 21% | 11% | 0% |
| H in Methane (CH4) | 16% | 7% | 3% | 0% | 0% | 0% | 0% |
| C in Carbon Black (Mol | 65% | 70% | 72% | 75% | 79% | 89% | 100% |
| C in Other (Mol %) | 35% | 30% | 28% | 25% | 21% | 11% | 0% |

Lower Temperature Range More Economical—

At an average PRR temperature just above 1,501° C. more than ⅔rds of the hydrogen in natural gas is dissociated into hydrogen gas ($H_2$) and over ⅔rds of the carbon has formed a separable carbon black solid by-product ($C_s$). Beyond about 2,500° K (2,227° C.) added energy and heat dissociates hydrogen gas ($H_2$) into monatomic hydrogen (H), dissociates Acetylene ($C_2H_2$) into monatomic hydrogen (H) and the unstable $C_2H^+$ radical, and further dissociates the unstable $C_2H^+$ radical into hydrogen (H) and carbon.

The Cost of Higher Temperatures—

The reactor vessel, component and plasma energy costs associated with pushing all these reactions to 100% thermal dissociation at approximately 5,000° K (4,727° C.) and above may well recommend operation at a lower temperature, such as one within the lower temperature range. However, operation in the higher temperature range is not precluded.

Syngas Mix Below 1,501° C.

While also not precluded, operation below 1,501° C. produces lower Methane conversion ratios, retaining more bound carbon in the resulting syngas in the form of residual Methane, Acetylene and other gaseous hydrocarbons. The cost of further syngas treatment—to separate hydrogen from the remaining gaseous starting materials and reaction products to produce a higher-hydrogen syngas—may also recommend operation above 1,501° C. Ultimately, the process temperature selected by the operators will be driven by their reactor design, production objectives, such as syngas demand (kg/hr), target mix and process economics.

Referring now to FIG. 10 presents two alternative PAA designs in rectilinear and cylindrical coordinate systems, respectively. Each PAA is assumed to be mounted at the top of its respective reactor vessel. The single-unit PAA may be connected to the reactor vessel using a rectangular or circular flange mounting best suited to the reactor vessel employed. However, other PAA designs, flange shapes and mounting locations are not precluded. These two alternative designs are for a 4-source PAA and are intended for use in different reactor vessels. The single In-Line PAA in rectilinear coordinates is more suited to a rectilinear, rectangular, box-shaped reactor vessel. Plasmas enter into the rectilinear reactor vessel through inlets labeled (IL10). Starting materials enter through inlets labeled (IL20). The ring-shaped, "showerhead" type PAA design in cylindrical coordinates is more suited to a cylindrical reactor vessel. Plasmas enter the cylindrical reactor vessel through inlets labeled (SR10). Starting materials enter through the inlet labeled (SR20).

Natural Gas as a Starting Material

Referring now to FIG. 11 presents 12 plasma sources in a three-row rectilinear configuration best suited for a rectangular, box-like reactor vessel. FIG. 11 also presents 12 plasma sources in a multi-ring "shower-head" type arrangement best suited for a cylindrical reactor vessel. Together the 12 plasma sources form a PAA to create a merged three-dimensional plasma reacting region. This data is for the Larger Natural Gas-fed PAA identified in the Table LNG with an H-Syngas output objective of 12,500 kg/hr. However, other starting materials and syngas production objectives are not precluded.

TABLE LNG

Larger Natural Gas-Fed Plasma Array Apparatus Embodiment

| Plasma Array Apparatus | | |
|---|---|---|
| Design Measures | Each Plasma Source | Combined Plasma Sources |
| Plasma Source Power (kW) | Up to 2,450 | Up to 27,600 |
| Number of Sources | 1 | 12 |
| Type | Alter NRG Self-stabilized | Alter NRG Marc-11 Self- |
| Efficiency (%) | ~70% | ~70% |
| Plasma Temperature | ~5,313° C | ~5,313° C. |
| Inter-source Spacing (m) | — | ~0.3 |

| Starting Material | | |
|---|---|---|
| Attribute | Description | Comments |
| Starting Material Type | Natural Gas | Pipeline quality |
| Predominant Chemical | Methane (CH4) | C(12 AMU) + 4 * H (1 AMU) = 6 |
| Pre-Heat Temperature | ~325° C. | To lower per unit plasma energy |
| Moisture Content | ~0 1% | Extremely dry |
| Input Feed Rate (kg/hr) | Up to 50,000 | Up to 110,200 lbs/hr |
| Per Unit Energy Input (kW/kg) | ~0.5 | — |
| Total Energy Inputs (kW-net) | Up to 27,600 | — |
| H-Syngas Output Rate (kg/hr) | Up to 12,500 | Up to 28,000 lbs/hr |

| Reactor Vessel | | |
|---|---|---|
| Attribute | Description | Comments |
| Nominal Operating Pressure | ~1 ATM | Atmospheric |
| Nominal Operating | ~1,727° C. | Steady-state temperature |
| Vessel Radius (m) | 1.75 | 11.5 ft. diameter |
| Vessel Height (m) | 12.2 | 38 ft. |
| Vessel Active Volume (m$^3$) | 120 | 4000 cu. ft. |
| Residence Time (seconds) | Up to ~3.3 | As required by the starting material |
| H-Syngas Output (m$^3$/hr) | Up to 2,800 | Up to 39 cu. m/s |

Some Alternative Designs—

The plasma sources identified above are mounted together as a single PAA located at the top of the reactor vessel. However, other arrangements and mounting locations are not precluded. In this case, the operator could have used either a single-unit PAA, or a multi-unit, clustered plasma source PAA. The rectilinear-style PAA is best suited for use with a rectangular reactor vessel, while the ring-shaped "shower-head" type arrangement PAA is best suited for use with a cylindrical reactor vessel.

Case Description—

In this case, the cylindrical multi-ring PAA (FIG. 11) was selected as best suited to the syngas production objective and cylindrical reactor vessel employed. The inner ring is a grouping of four (4) clustered equidistant plasma sources centered on the reactor vessel centerline ("CL"). This inner ring is surrounded by an outer ring of eight (8) additional clustered plasma sources, also centered on the reactor vessel centerline ("CL"). The starting material inlets are interspersed between the 12 plasma sources, together forming a single-unit PAA, acting something like a shower head, to create a single large merged three-dimensional columnar plasma reacting region.

Plasma Sources—

The specifications for the clustered plasma sources identified above are for the Model Marc-11 (High) self-stabilized and non-transferred arc plasma torch manufactured by Alter NRG (formerly Westinghouse), Calgary, Alberta, Canada, or a similar device.

Cylindrical Coordinates=The plasma sources in the respective inner and outer rings of the "shower-head" are located at the radii, "$r_1$" and "$r_2$," respectively. Each ring is in the form of an equidistant circle with its plasma sources equidistant from the reactor vessel centerline and equidistant from each other, as indicated in this particular cylindrical coordinated PAA design. Other arrangements are not precluded. In this case, the values of "ri" and "$r_2$" from the centerline of the reactor vessel to the inner and outer plasma source rings are ~0.3 and ~0.6 m, respectively. The inner ring plasma source angular displacements for the angular dimension theta ($\theta$) are 0, 90, 180 and 270 degrees around the reactor vessel centerline ("CL"). The plasma sources in the outer ring are located at 45 degree intervals. The inner and outer rings are shown offset by 27.5 degrees. Other arrangements and mounting locations are not precluded.

Aiming and Canting—

Some or all of the plasma sources and starting material inlets may be angled off of the perpendicular. The plasma sources may be aimed by canting each around the ring, e.g., 5 to 45 degrees from the PAA vertical "z" dimension, in a coordinated fashion to help drive a helical vortex movement of reacting plasmas and starting materials within the cylindrical reactor vessel. The plasma sources may also be canted otherwise, e.g., such as radially inward toward the starting material inlets and/or the reactor vessel centerline by 5 to 30 degrees from vertical, to promote mixing with the entering starting materials. In this case, the each plasma source in the outer ring is aimed by canting it inward 15 degrees and around the ring in theta (θ) by 30 degrees from vertical to support a helical vortex, motion in the plasma reacting region or PRR.

Starting Materials—

In this case, the nine (9) starting material inlets are mounted as interspersed rings within the PAA, centered on the same reactor vessel centerline ("CL") at the top of the reactor vessel, surrounded by the 12 plasma sources. The starting material inlets are located one at the centerline ("CL") and eight are mounted between the inner and outer plasma source rings. The eight outer starting material inlets are mounted in two alternating rings, with individual inlets in both rings located 90 degrees apart. The two rings are shifted 45 degrees from each other. The entering starting materials are surrounded by and merge with the adjacent, emerging plasmas. The starting material inlets may employ canting and/or angled flow fins to deflect, spread and/or rotate the incoming starting materials, further supporting mixing and the helical vortex movement of the reacting plasmas and starting materials within the PRR. This optional helical vortex movement may help increase mixing, reaction product path length and residence time, so as to meet the operator's process parameters. In this case, the center inlet employs X-shaped inlet fins centered on the inlet, angled 30 degrees from vertical and aimed in the same direction as the plasma sources to support a helical vortex motion in the PRR. The four outermost starting material inlets use single blade deflectors angled 30 degrees from vertical, aimed in the same direction as the outer ring of plasma sources.

The plasmas and starting materials emerge from their respective inlets and merge into a single large three-dimensional plasma reacting region or PRR. Therein, the starting materials thermally dissociate into a mixture of hydrogen gas, elemental carbon and other products, which mixture depends on the nominal operating temperature selected by the operator. The objective is to dissociate starting materials, e.g., fossil fuels and dry bio-fuels, into hydrogen gas and other by-products, removing substantial carbon in order to produce a synthetic gas substantially composed of hydrogen (H-syngas). See the Table SNG and LNG discussions.

Figures—

FIG. 11 presents the 12 plasma sources in a multi-ring "shower-head" type arrangement best suited for the cylindrical reactor vessel envisioned in this case. It is a single-unit PAA mounted at the top of this larger cylindrical reactor vessel. The single-unit PAA may be connected to the reactor vessel using a rectangular or circular flange mounting best suited to the reactor vessel employed. However, other PAA designs, flange shapes and mounting locations are not precluded.

The two alternative designs in FIG. 11 are for a 12-source PAA and are intended for use in different reactor vessels. The Three Row PAA design described in rectilinear coordinates (FIGS. 2 and 7) is more suited to a rectilinear, rectangular or box-shaped reactor vessel. Plasmas enter the reactor vessel through inlets labeled (3R10). Starting materials enter the reactor vessel through inlets labeled (3R20). The Two-Ring PAA design described in cylindrical coordinates is more suited to a cylindrical reactor vessel. Plasmas enter the reactor vessel through inlets labeled (2R10). Starting materials enter the reactor vessel through inlets labeled (2R20).

Coal as a Starting Material—

Figure 4:
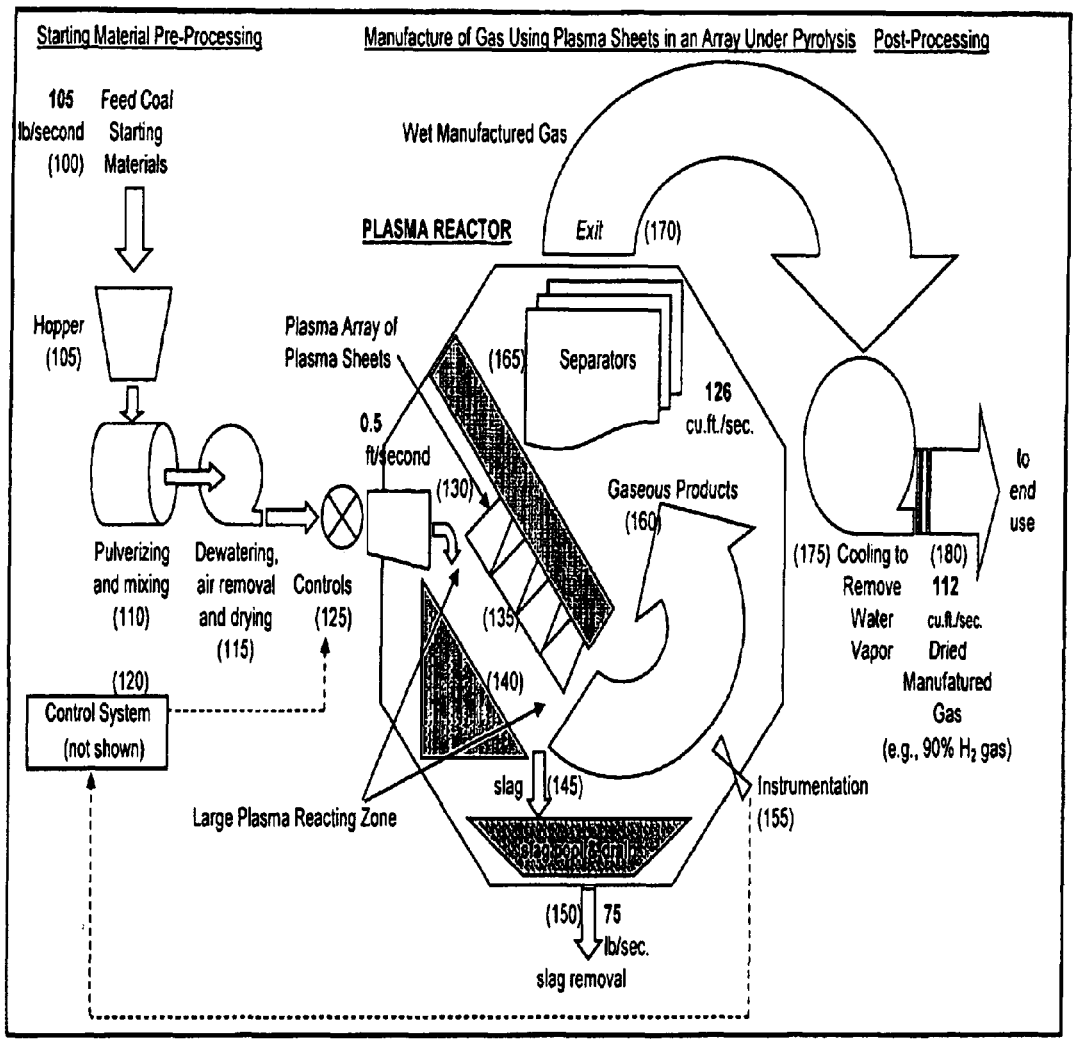
FIG. 4 contains a system using a plasma sheet, operating in a plasma reactor for the purpose of producing H-syngas for the generation of electricity.
Figure 5:
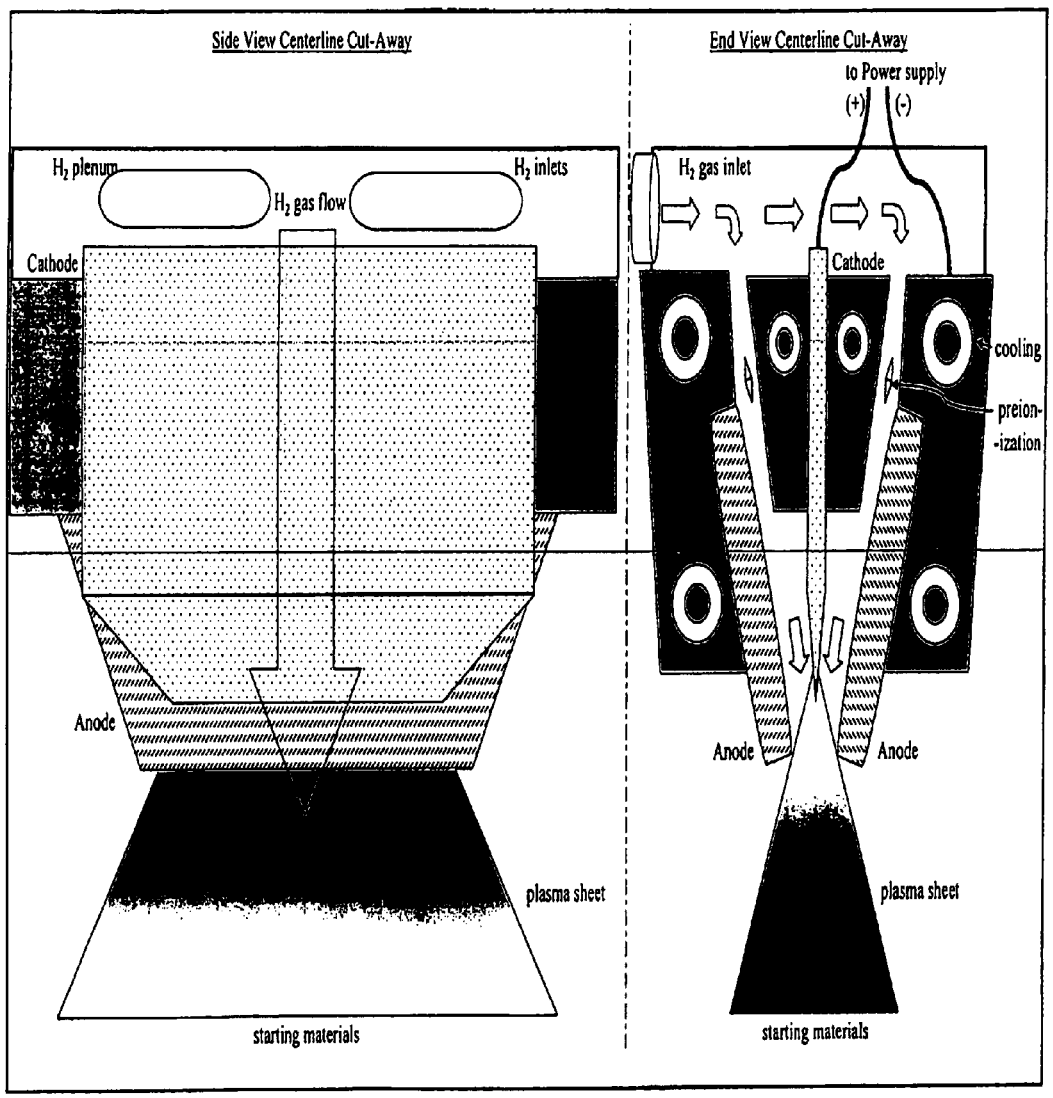
FIG. 5 contains a side and end view of an elongated plasma sheet.

The production of H-syngas from coal and other solid hydrocarbon-containing starting materials, e.g., dry solid bio-fuels, presents special challenges not evident when using natural gas as a starting material. FIGS. 4 and 5 show a plurality of 30 plasma sources, together forming a larger high-powered PAA, and creating a large, merged three-dimensional donut or hockey puck-shaped plasma reacting region. This case is summarized in Table LC for a Larger Coal-fed PAA with a high H-Syngas output objective of 29,000 kg/hr., more than twice as large as the previous (LNG) natural gas-fed production objective. Yet, other starting materials and syngas production objectives are not precluded.

TABLE LC

Larger Coal-Fed Plasma Array Apparatus Embodiment

Plasma Array Apparatus

| Design Measures | Each Plasma Source | Combined Plasma Sources |
| --- | --- | --- |
| Plasma Source Power (kW) | Up to 2,450 | Up to 73,100 |
| Number of Sources | 1 | 30 |
| Type | Alter NRG Self-stabilized | Alter NRG Marc-11 Self-stabilized |
| Plasma Carrier Gas | H-Syngas or Natural Gas | H-Syngas or Natural Gas |
| Efficiency (%) | ~70% | ~70% |
| Plasma Temperature | ~6,000° C. | ~6,000° C. |

Starting Material

| Attribute | Description | Comments |
| --- | --- | --- |
| Starting Material Type | High Volatile Bituminous | Dried, pulverized River King Illinois #6 |
| Predominant Chemical Species | Complex hydrocarbon tars | Complex hydrocarbon tars |
| Pre-Heat Temperature | ~100° C. | To lower per unit plasma energy inputs |
| Nominal Moisture Content | ~1% | Dried, pulverized |
| Input Feed Rate (kg/hr) | Up to 132,500 | Up to 585,000 lbs/hr (293. tons/hr) |
| Per Unit Energy Input (kW/kg) | ~0.6 | — |
| Total Energy Inputs (kW-net) | Up to 73,100 | — |
| H-Syngas Output Rate (kg/hr) | Up to 29,000 | Up to 127,000 lbs/hr |

TABLE LC-continued

Larger Coal-Fed Plasma Array Apparatus Embodiment

Reactor Vessel

| Attribute | Description | Comments |
|---|---|---|
| Nominal Operating Pressure | ~1 ATM | Atmospheric |
| Nominal Operating Temperature | ~1,923° C. | Steady-state temperature |
| Vessel Radius (m) | 2 | 13.1 ft. diameter |
| Vessel Height (m) | 43.2 | 134 ft. |
| Vessel Active Volume ($m^3$) | 543 | 19000 cu. ft. |
| Residence Time (seconds) | Up to ~6 | As required by the starting material |
| H-Syngas Output ($m^3$/hr) @ NTP | Up to 300,000 | Up to 80 cu. m/s |

Some Alternative Designs—

The plasma sources identified above are clustered together forming a single cylindrical PAA clustered in the top part of the reactor vessel. However, other arrangements and mounting locations are not precluded. In this case, the operator could have selected either a large single-unit PAA, or a multi-unit, clustered plasma source PAA. The rectilinear-style PAA is best suited for use with a rectangular reactor vessel, while the ring-shaped "shower-surround" type arrangement PAA is best suited for use with a cylindrical reactor vessel.

Case Description—

In this case, the plasma sources in this PAA are mounted together in a clustered, cylindrical ring-shaped "shower-surround" type arrangement formed around the circumference of a portion of the top part of the cylindrical reactor vessel. Together they form a multi-unit, clustered plasma source PAA device, a plasma array apparatus matrix of rows and columns in cylindrical coordinates. In this case, the array is a cluster of 30 plasma sources. This cluster of plasma sources is arranged in a cylindrical ring-shaped "shower-surround" type arrangement injecting plasmas from the reactor vessel sides. It forms a donut or hockey puck-shaped three-dimensional PRR surrounding, heating and mixing with the in-falling pulverized or powdered coal feed (or dry solid bio-fuels). The multi-unit, cluster of plasma sources acts in a manner similar to a single-unit PAA to create this single large three-dimensional PRR.

Plasma Sources—

The specifications for the multi-unit, clustered plasma sources identified above are for a Model Marc-11 (High) self-stabilized and non-transferred arc plasma torch by Alter NRG (formerly Westinghouse), Calgary, Alberta, Canada or a similar device.

Cylindrical Coordinates—

The 30 plasma sources are mounted around the outside of a portion of the top wall of the reactor vessel in three clustered rows or rings, all at the same radius "r," i.e., equidistant from the vertical reactor vessel centerline in cylindrical coordinates. In this case, the value of "r" from the centerline ("CL") to the plasma sources is the same as the reactor vessel radius of ~2 meters. The rows or rings may be aligned or staggered. In this case, the 3 rows or rings use a vertical stacking distance of ~1.3 m. These clustered plasma sources may be aimed downward toward the intended direction of flow, e.g. 5 to 45 degrees from horizontal, and may also be canted in the angular dimension theta (Ø), e.g., 5 to 30 degrees, in a coordinated fashion to drive a helical vortex movement of reacting plasmas and starting materials within the reactor vessel. This optional helical vortex movement may increase mixing, reaction path length and residence time.

In this case, the 30 plasma sources are in the 3 rows or rings of 10 plasma sources each, in rows or rings with individual plasma sources located in the angular dimension theta (Ø) at 36 degree intervals. The 3 rows or rings are equal-spaced in "r," theta (Ø) and "z." Successive rows or rings are shifted by 18 degrees creating an alternating plasma injector pattern. Other arrangements performing a similar function are not precluded.

Aiming and Canting—

In this case, the plasma sources are aimed downward toward the intended direction of flow 30 degrees, and are canted in the angular dimension theta (Ø) by 30 degrees in a coordinated fashion. However, other aiming and canting angles performing a similar function are not precluded.

Starting Materials—

The dried, pulverized, powdered coal or dry solid bio-fuel or other municipal solid waste (MSW) is injected into the reactor vessel from the top row of the PAA near the top of the reactor vessel. Side mounted injectors are shown. However, other starting material feed arrangements are not precluded. One or more starting material inlets may be used, as may be required. The starting material inlets may also be angled downward, e.g., 5 to 45 degrees, and canted in the angular dimension theta (Ø), e.g., 5 to 30 degrees, to support an optional helical vortex flow within the reactor vessel.

In this case, the two starting material inlets shown in FIG. 10 form the top row or ring of the cylindrical PAA. The starting material inlets both employ solid material injectors or spreaders. These injectors or spreaders deliver a 30 degree-wide dispersal of starting materials into the upper reactor vessel. All the plasma source and starting material inlets are aimed downward 30 degrees and are canted off the radial axis 30 degrees to support a helical vortex flow within the reactor vessel. However, other PAA plasma source and starting material inlet arrangements, aiming and canting angles, PAA mounting locations and other starting materials are not precluded.

The starting materials are injected and drawn downward into the plasma reacting region under the influence of starting material injector or spreader pressure, inertia and gravity. The plasmas and starting materials emerge from their respective inlets and merge into a large three-dimensional plasma reacting region similar to a turbulent fluidized bed. Therein, the complex tars in the coal or dry solid bio-fuel, are first heated, are next volatilized and then are finally dissociated into hydrogen gas, elemental carbon and other by-products.

A Specialized Reactor Vessel—

Application of Electrostatic and Magnetic Forces—All the PAA designs discussed above may provide added advantages when used in combination with the specialized reactor vessel disclosed here. This specialized reactor vessel may be used to engage certain externally-applied electrostatic and/or magnetic forces to improve syngas quality through better by-product separation.

Electrostatic Forces—

Figure 8:
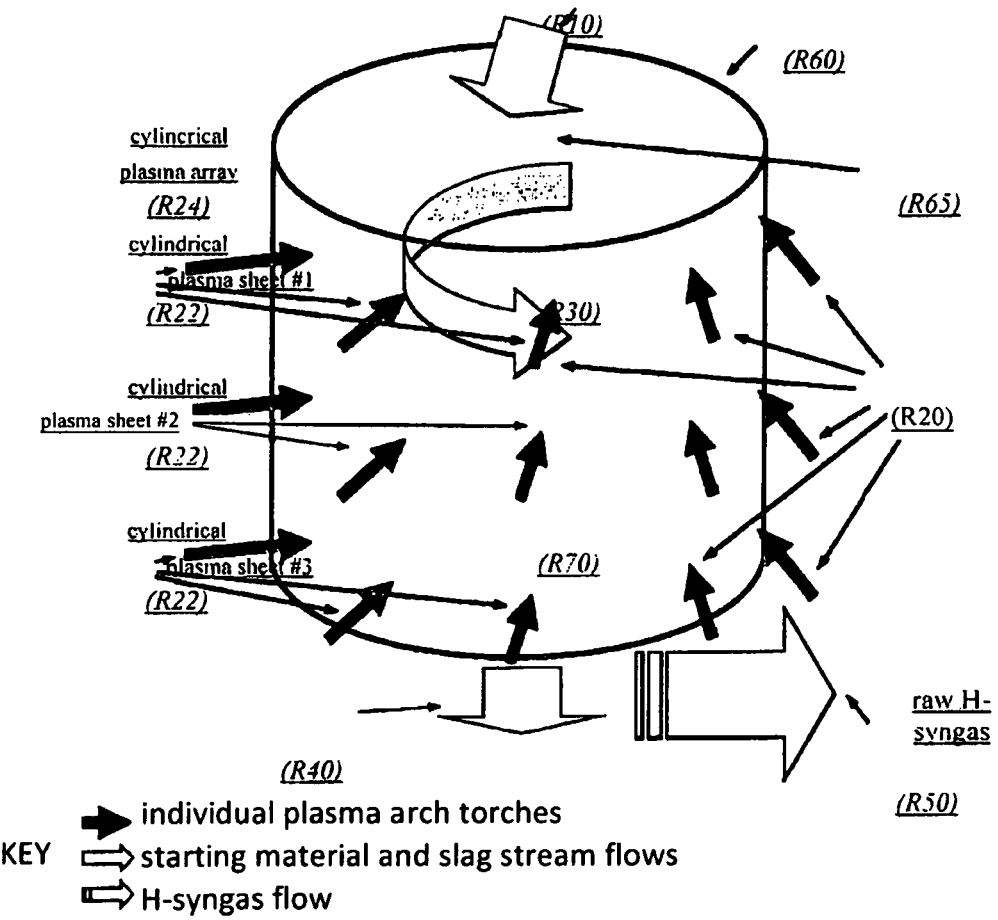
FIG. 8 contains a schematic side view of the disclosed plasma cylinder, which is a plasma array apparatus translated into cylindrical coordinates.

An electrostatic charge may be applied between the PAA pre-ionization area in FIG. 6 at (40) and a collection grid (not shown) located at reactor vessel by-product collector/outlet in FIG. 8 at (R40). This electrostatic precipitator ("ESP") or ESP-like option may be employed using this optional arrangement of the PAA, in conjunction with the specialized reactor vessel disclosed here, to improve syngas quality. The purpose of this optional PAA arrangement is twofold.

First, it facilitates arc-formation in arc-type plasma sources like those depicted in FIG. 6 at (50). It also helps reduce the amount of carbon black and other solid by-products contained in the exiting syngas in FIG. 8 at (R50) through better solid by-product collection.

In FIG. 6, the carrier gas flowing through the pre-ionization area at (40) gains an electrostatic charge by corona discharge from a "whisker" electrode at (40) supplied by a high voltage DC power supply (not shown). This creates either a surplus or deficit of electrons in the carrier gas. A typical high voltage DC power supply in this use employs an operating voltage of between 30 to 70 kV, dependent on design factors. Alstom, NWL, Spellman and others manufacture such high voltage DC power supplies. The corona discharge supplies a negative (or alternatively a positive) charge to the carrier gas by either injecting (or withdrawing) electrons from the carrier gas flowing through the pre-ionization area in FIG. 6 at (40). Injecting electrons is preferred, but withdrawing electrons is not precluded. An excess of charge, in this case an excess of conducting electrons received from the corona discharge, facilitates formation of the plasma arc current path produced downstream through the carrier gas at FIG. 6 (50). The excess electrons readily conduct electricity, reducing the carrier gas break-down voltage, promoting carrier gas ionization, assisting in the creation of the electric arc and plasmas formed at FIG. 6 (50).

Further, the plasmas formed at FIG. 6 (50) retain the net electrostatic charge excess applied to the carrier gas at FIG. 6 (40). The PRR formed at FIG. 6 (70) likewise retains that same excess electrostatic charge, e.g., in this case an excess of electrons over positive ions in the plasma. Similar "whisker" electrodes and high voltage DC power supplies (not shown) may also be used to inject charge into the starting materials and/or process chemicals emerging from the PAA. This excess charge is also carried over into the PRR. Excess charge carried into the PRR may then collect on the surface of solid byproduct particles formed. Because like charges repel, the operator may also choose to apply a similar electrostatic charge to the reactor vessel walls, which causes them to repel the solid by-product particles formed in the PRR, reducing wall contact, thermal losses, thermal stresses, and particle accumulation on the cooler reactor vessel walls. The reactor vessel by-product collector/outlet in FIG. 8 at (R40) may be electrically insulated from the remainder of the vessel, outfitted with an optional solid particle collection grid and/or plates (not shown) which are oppositely charged. The opposite charge in FIG. 8 at (R40) attracts charged solid by-product particles to the by-product collector/outlet FIG. 8 at (R40). In this way the PAA and this specialized reactor vessel work together like an electrostatic precipitator, collecting charged by-product particles for discharge in FIG. 8 at the by-product collector/outlet at (R40). The use of the specialized reactor vessel disclosed here with this optional charge (e.g., electron) injection by corona discharge, e.g. FIG. 8 at (40), and ESP-function, is contemplated in the PAA cases identified above.

Magnetic Forces—

This magnetic force (MF) option involves applying an externally-created magnetic field to the PRR in the specialized reactor vessel. Application of the MF field to the PRR in the specialized reactor vessel creates an interaction with the PRR. Such interaction points may include, but are not limited to, application near the syngas outlets below (R70) on FIG. 8. The externally-created magnetic field may result in an MF interaction with the flowing ionized plasmas, including, but not limited to, a deflection or 'pinch' in the three-dimensional PRR shape. This reaction is specifically in response to the externally-created magnetic field. This interaction may cause the plasmas, heated reactants and by-products to change their linear and/or rotational velocities (w) in response to its application. Velocity may increase and direction of movement may change. In the case of a rotating helical vortex flow in an MF field, the accelerated rotational velocity may act like a centrifuge, flinging solid by-product particles from the syngas as it passes through the MF interaction zone on its way toward the syngas exits. This MF interaction serves as a partial block to solid by-products particles still entrained in the exiting syngas.

A pinch, in this case a PRR narrowing, flow diversion or constriction, is generally described as the compression of an electrically conducting filament by magnetic forces. The conducting medium is typically a plasma gas. In a z-pinch, the current is axial, in the z direction in a cylindrical coordinate system, and the magnetic field azimuthal; in a theta-pinch, the current is azimuthal, in the theta direction in cylindrical coordinates, and the magnetic field is axial. The phenomenon may also be referred to as a "Bennett pinch" (after Willard Harrison Bennett), "electromagnetic pinch", "magnetic pinch", "pinch effect" or a "plasma pinch." Either approach may be employed in this specialized reactor vessel either alone or in combination with the electrostatic ESP-like affects identified above. Manufactures of z-pinch devices include Energetiq Technology of Woburn, Mass., Emerging Technologies of Santa Clara, Calif. and Lawrence Livermore National Laboratory, Livermore, Calif. The overarching objective is to improve syngas quality by improving solid by-product particle separation and reducing solid by-product particle carry-over through entrainment in the exiting syngas.

Plasma Sheet, Array, Cylinder, Sphere and Segment Apparatus—

The various versions of the named PAA invention are referred to here as the plasma sheet apparatus or PSA, the rectilinear plasma array apparatus, the plasma cylinder, the plasma hemisphere and plasma sphere, and the plasma segment. The named method is the large-scale pyrolytic extraction of a manufactured gas substantially containing hydrogen from hydrogen-bearing starting materials using the named inventions or similar means in a reactor operating under oxygen-constrained, non-stoichiometric pyrolytic conditions. In the disclosed method a PSA, PAA, plasma cylinder, plasma hemisphere or plasma sphere, and/or plasma segment is used as a heating source to pyrolyze starting materials in a reactor, extracting a manufactured gas substantially containing hydrogen, while most carbon and other by-products are separated from this gas and are removed from the reactor.

Plasma Sheet, Array, Cylinder, Sphere and Segment Compared—

The PSA starts as a near 1-dimensional, straight or curved line apex formed from several plasma sources and the plasma widens into a 3-dimensional, elongated, pyramidal form. It is this elongated pyramidal volumetric plasma reacting region which improves the reactor throughput and efficiency for the large-scale conversion of starting materials relative to a simple'single arc plasma torch. The PAA starts as a 2-dimensional flat, curved or folded sheet apex which in layers can create an even larger 3-dimensional plasma reacting region. The plasma cylinder may be formed from a PAA folded or translated into cylindrical coordinates (FIG. 8). The plasma hemisphere and plasma sphere may be formed from a PAA folded or translated into spherical coordinates. The plasma segment may be formed either from a finite-span PAA in rectilinear coordinates or a finite-angle array folded or translated into cylindrical or spherical coordinates. Many different arrangements are possible. All the larger 3-dimensional reacting regions created allow for either or both longer reacting times and/or higher starting material throughput rates, than is attainable with other simpler designs.

Forming a Plasma Sheet Apparatus—

A PSA may be formed from a number of different means. Rather than using a rod-shaped design, typical of the traditional plasma arc torch, the PSA may be formed from an elongated cathode and anode or a series of cathodes and anodes in various arrangements (see FIG. 6). Similar means might involve a row or in-line grouping of separate plasma arcs, whereby the row or grouping of individual intense conical-shaped plasmas overlap and merge into a single larger elongated pyramidal plasma reacting region.

Plasma Sheet Apparatus Detailed Description—

The following description will refer to the in-line serial multi-part PSA in FIG. 6, but will generally apply to all designs with similar purpose, including elongated electrode and all multi-arc designs. The objective of the device is to produce a larger plasma reacting region in order to accommodate larger mass-flow rates and/or longer reacting times, as may be required for the large-volume processing of starting materials.

FIG. 6—

The disclosed process produces a large volume of manufactured gas and by-products, the latter by-products containing substantial quantities of carbon in the form of carbon black or soot. This by-product carbon may be fashioned into manufactured-carbon, consumable electrodes. These electrodes (10) and (20) are supported mechanically by insulating structures (not shown) and connected electrically to a power supply (30) (not shown), both of whose design and use is well understood by those skilled in the art. As atoms oblate from the surface of the electrodes, this material will need to be replaced periodically. Either stationary or auto-advancing electrode designs may be used. The embodiment contained in FIG. 6 contemplates an advancing cathode design (10). As the cathode tip is consumed by the process, the electrode is fed down into the holder by mechanisms not shown, but whose design and use is well understood by those skilled in the art. Optional pre-ionization of the entering carrier gas by coronal discharge or similar means in the pre-ionization area (40) prepares the gas for conduction and full ionization in the electrical arc (50). The electrical arc through and ionizing the carrier gas is formed between the two electrodes (10) and (20). Other electrode designs and arrangements are also possible. The carrier gas (60), in this case manufactured gas substantially containing hydrogen, is introduced into a plenum above the PSA support assembly (65). Gas flows down into orifices (not shown) leading to the pre-ionization area (40) where the gas is partially ionized improving its conductivity. From there the gas flows down into the electrical arc, plasma formation region (50). Electrons flowing through the electrical arc (not shown) heat the gas dissociating it into atoms and then the atoms into their electron and proton-nuclei constituents. The electrical arc raises the temperature of the carrier gas to the process design temperature. The overall process design and specifically the plasma temperature (70) used is a function of a number of parameters, including, but not limited to, the composition and flow-rate of the starting materials, the physical design of the reactor, the process objectives and the desired manufactured gas composition. The temperature sought for the dissociating starting materials (80) will also be a factor in determining the PSA design and plasma temperature used. The process should seek to maximize hydrogen production, while avoiding the unintended production of undesirable chemical species.

Forming a Plasma Array Apparatus—

The PAA may be formed from two or more plasma sheet apparatus. It may also be formed by a perforated sheet. The PAA may be used to form a larger 3-dimensional plasma reacting region with both greater width and depth. The advantages of these larger reacting regions include increased reaction time, which results in more complete reactions, and the ability to handle higher starting material throughput rates, while maintaining the overall manufactured gas production process objectives.

Plasma Array Apparatus—

Detailed Description—This following description will refer to the multi-part PAA in FIG. 7, but will generally apply to all designs with similar purpose, including elongated electrode and all multi-arc designs. The objective of the device is to produce an even larger reacting plasma region in order to accommodate larger mass-flow rates and/or longer reacting times required for the very large-volume processing of starting materials.

FIG. 7—

In this embodiment, the multi-arc PAA is constructed of three serial in-line multi-arc plasma sheet apparatus. Other similar designs and arrangements are also possible. Electrodes (10) and (20) are supported mechanically by insulating structures (not shown) and connected electrically to a power supply (30) (not shown), both of whose design and use is well understood by those skilled in the art. As atoms oblate from the surface of the electrodes, this material will need to be replaced periodically. Either stationary or auto-advancing electrode designs may be used. The embodiment contained in FIG. 7 contemplates an advancing cathode design (10). As the cathode tip is consumed by the process, the electrode is fed down into the holder by mechanisms not shown, but whose design and use is well understood by those skilled in the art. Optional pre-ionization of the entering carrier gas by coronal discharge or similar means (40) (partially shown) prepares the carrier gas for conduction and full ionization in the electrical arc (50). The electrical arc through and ionizing the carrier gas is formed between the two electrodes (10) and (20). Other electrode designs and arrangements are also possible. The carrier gas (60), in this case manufactured gas substantially containing hydrogen, is introduced into a plenum above the PAA support assembly (65). Gas flows down into orifices (not shown) leading to the pre-ionization area (40) (incompletely shown) where the gas is partially ionized improving its conductivity. From there the gas flows down into the electrical arc, plasma formation region (50). Electrons flowing through the electrical arc (not shown) heat the carrier gas dissociating it into atoms and then the atoms into their electron and proton-nuclei constituents. The electrical arcs raise the temperature of the carrier gas to the process design temperature. The overall process design and specifically the plasma temperature (70) is a function of a number of parameters, including, but not limited to, the composition and flow-rate of the starting materials, the physical design of the reactor, the process objectives and the desired manufactured gas composition. The temperature sought for the dissociating starting materials (80) will also be a factor in determining the PAA design and plasma temperature used. The process should seek to maximize hydrogen production, while avoiding the unintended production of undesirable chemical species.

The Plasma Cylinder and 3D3P Reactor—

Figure 9:
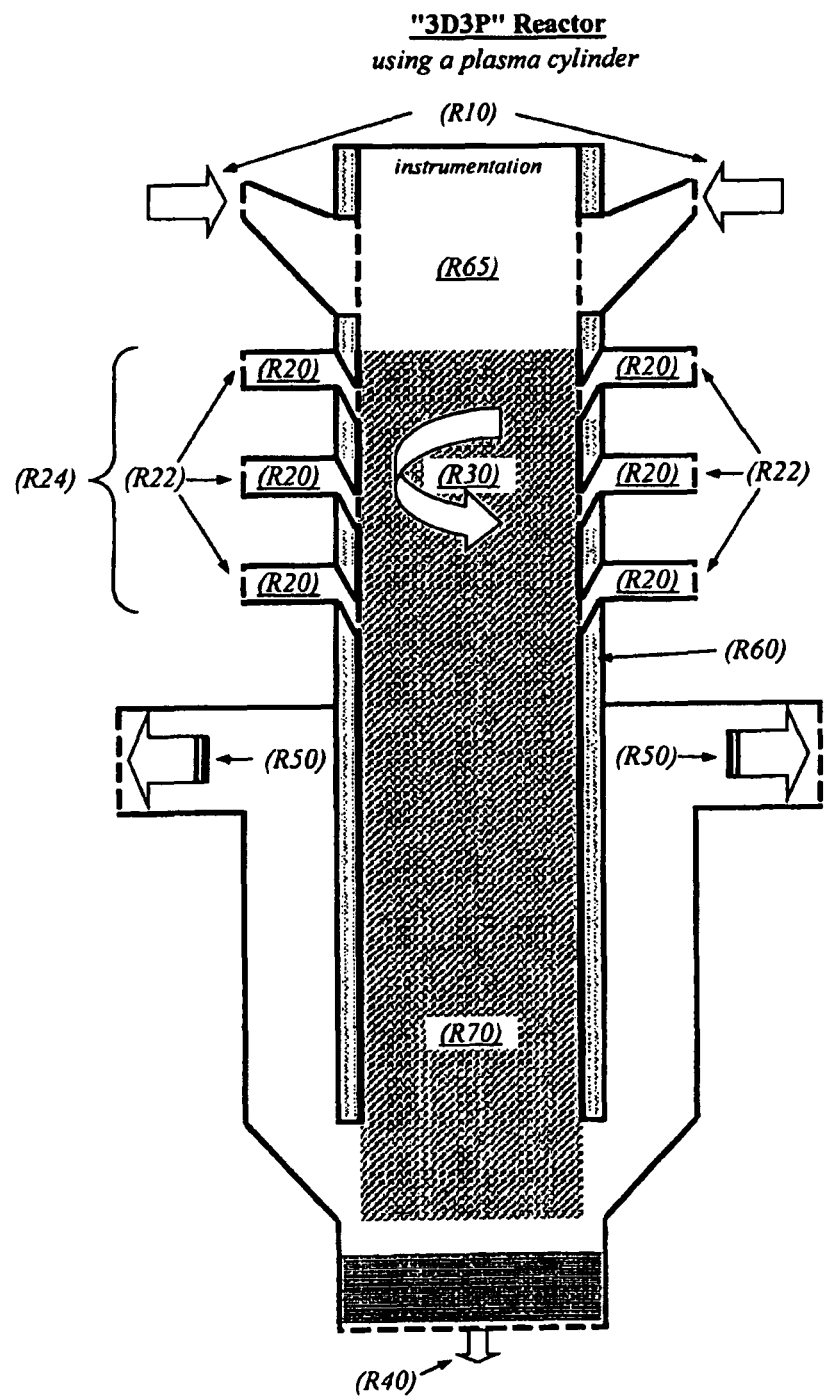
FIG. 9 contains a schematic slice or section view of a reactor using a plasma cylinder.

The Plasma Cylinder—The plasma cylinder disclosed in FIG. 9 is a PAA wrapped into cylindrical coordinates to form a columnar inward-pointing PRR. Plasma cylinders may use straight-flow or angled vortex-flow. In straight flow the in-falling starting materials pass straight through the plasma-heated plasma reacting region of the reactor. In the vortex-flow design, the plasma jets may be angled so as to create a tornado-like helical vortex in the PRR from the plasmas injected into the reactor. The vortex in FIG. 9 at (R30) may be used to create a longer, helical, cylindrical path length for materials falling within the reactor to increase residence time for less volatile starting materials, like pulverized coal or dry biomass. In this embodiment, the disclosed plasma cylinder at (R24) is formed from multiple cylindrical horizontal PSA at (R22), made up of individual angled plasma arcs (R20). Other configurations with similar purpose and intent also fall within the scope of the claimed inventions.

The 3D3P Reactor—

For the 3-dimensional plasma pyrolysis process reactor (3D3P Reactor) disclosed here in FIG. 8 in vertical cross-cut view, starting materials at (R10) are introduced at the top of the reactor at (R65). Individual angled plasma arcs at (R20) form cylindrical horizontal PSA's at (R22). These cylindrical horizontal PSA's are stacked so as to form the 3-dimensional cylindrical PAA (R24) and the columnar PRR of the plasma cylinder at (R30). Sheets and/or individual plasma arcs may be arrayed either in an aligned or staggered arrangement. Angling and canting of both the plasmas and starting materials as they are injected into the reactor may also be used to form an elongated helical, cylindrical, downward-spiraling vortex path at (R30) through the 3D3P Reactor (R60), lengthening the reaction path and, therefore, the time that in-falling feed materials are exposed to the PRR of the 3D3P Reactor (R60)—in FIG. 8, the shaded region from the area surrounding (R30) through the area surrounding (R70). The by-product carbon black, soot and/or slag stream collects and then exits the reactor at the bottom at (R40). The desired raw high-hydrogen, low-carbon H-Syngas mixture is drawn off from the column at (R50) and is directed to the gas clean-up system (not shown).

Plasma Arc Torch is Less Desirable—

A single plasma arc torch involves an intense near zero-dimensional or point source. The plasma forms an intense narrow focal heat source, slightly cylindrical or conical in shape, with a narrow plasma reacting region, its apex formed at the plasma arc torch anode. These narrow single plasma reacting zones may be acceptable for use in a laboratory environment or for a small scale, test or a pilot plant, either where demonstration-of-concept is the primary objective of the process design or where only a relatively low throughput rate is required. However, these narrow single plasma arc torch designs can prove to be less efficient, inefficient or unworkable when applied to the very large-scale extraction of manufactured gas substantially containing hydrogen from various starting materials as is discussed here.

The PAA disclosed here is an improvement over the standard single arc plasma torch, such as that used in other patents, for achieving the high-hydrogen H-syngas objective described herein. And it is this unique combination of the distinctive PAA, with its large shaped 3-dimensional plasma reacting region, and method employing a PAA-driven reactor, operating under oxygen-constrained non-stoichiometric pyrolytic conditions, that together enables the creation of this high-hydrogen H-syngas, which is substantially composed of hydrogen ($H_2$).

Process Discussion

Large Plasma Reacting Volumes Required—

As described in FIG. 12, both the PSA and the PAA are quite suitable for the large-scale dissociation of starting materials because of the larger reacting volume, longer reacting times and the improved plasma reacting region geometry allowed by their use. The large-scale production of manufactured gas from fossil fuels, such as natural gas, liquid petroleum products and coal, and bio-mass derived biofuels, for electric power production, is but one such example use. In order to provide for a sufficient input mass-flow rate and for full heating, gasification and dissociation of various chemical species, a suitable plasma volume and intensity must be generated and a sufficient plasma reaction residency time for starting materials must be achieved. The number and design of PSA and/or PAA used in the reactor, the power rating of each, the capacity and process objectives of the starting material feeding system, the size and capacity of the manufactured gas cleaning system, and, in the case of electric power generation, the number and size of any fuel cells, boilers and/or combined cycle combustion and steam turbines, are all variables to be determined in accordance with the type and volume of starting materials to be processed by the system, among other factors.

Method Description

Referring now to FIG. 4, moist solid starting materials (100) are fed into a hopper (105) where they flow into a pulverizer to be crushed to a consistent size and mixed for a uniform consistency (110). Excess water and air are then removed by a combination drier and gas replacement unit which may substitute a non-oxidizing gas for air (115). A control system (120) and reactor feed controls (125) manages the flow of pre-processed starting materials into the reactor (130). Plasma sheet apparatus in a plasma array apparatus (135) heat, gasify and dissociate starting materials to their various constituents in the large plasma reacting zone (140). By-products in slag form first drain into a slag pool (145) to be drained from the reactor (150), and then will be disposed of in vitreous form (not shown).

Gaseous products (160) flow upward to separators (165) where entrapped particles and ash are removed. Wet manufactured gas flows out of the reactor exit (170) to be further cleaned, cooled and dried at gas processing (partially shown) (175). Dried manufactured gas (180), e.g., 90% $H_2$ gas, then travels by pipeline to the end use (not shown) at a combined cycle electric power generator.

The reactor contains sensors (155) to detect the pressure and temperature inside the reactor, as well as gas sampling ports and appropriate gas analysis equipment at strategic positions in the reactor to monitor the gas manufacturing process. This information is fed to the Control System (120). The design and use of such equipment is well understood by those skilled in the art.

Alternatively, as shown in FIG. 8, natural gas is used as the feed material. It is a naturally dry feed material and so it does not need to be dried prior to its introduction into the 3D3P Reactor (R60). Natural gas may be pre-heated prior to being fed into the 3D3P Reactor (R60) and may also be used as a plasma carrier gas at (R20). Starting with the 3D3P step, natural gas is fed into the 3D3P Reactor (R60) at (R10). Plasmas are injected into the 3D3P Reactor at (R20). H-Syngas containing hydrogen, entrained carbon soot and residual hydrocarbons, exits the 3D3P reactor (R60) at (R50). Much of the carbon soot exits the reactor at (R40). After optional gas processing at (14), the hydrogen in the H-Syngas serves as an energy source for unique high-temperature process-matched solid oxide fuel cells (PM-SOFCs) (16) entering the hot box (15B) at (15). In FIG. 8, the hydrogen contained in the H-Syngas combines in the PM-SOFCs with preheated oxygen contained in hot turbine exhaust from (CT-8) entering the hot box at (15A), producing electricity (hot box (15B) and PM-SOFC (16) details not shown). Other oxygen sources are also possible. Remaining unutilized H-Syngas exits the PM-SOFCs (16) and hot box (15B) at (17), may be filtered and processed (not shown), and then is directed to a combustion turbine for use as a fuel at (18). The combustion turbine may be connected to a generator (similar to (19B), but not shown). The remaining hot exhaust gases emanating from the combustion turbine at (CT-8) may be directed to a heat-recovery steam generator (HRSG), an air-to-water heat exchanger at (19). Steam from the HSRG turns a steam turbine at (19A), which steam turbine is connected to a generator (19B) to produce electricity. the art, that various changes in form and detail may be made therein without departing from the spirit and scope of the invention and process claims.

Power Requirements—

The power requirements for the PSA and PAA are considerable and dependent upon the type and volume of starting materials processed. The pyrolytic heating, gasification and thermal dissociation of starting materials is a highly endoergic reaction requiring significant power input. Yet the energy value in the manufactured gas produced, i.e., containing $H_2$, is sufficiently high so as to more than offset this high initial energy cost.

Substantially Containing Hydrogen—

Many starting materials, such as coal and dry biomass, contain some trapped air and water. Even after pre-processing to remove air and water some still remains. Contained bound oxygen and oxygen from dissociation of air and water (and other oxides) in the starting materials is liberated in the plasma reactor. Each contributes oxygen to form some limited quantities of oxide by-product gasses in the manufactured gas, such as $SO_2$, $NO_x$ and some CO and $CO_2$. This is why—despite a predominantly hydrogen or inert gas reacting atmosphere, operating under oxygen-constrained, non-stoichiometric pyrolytic conditions—some less desirable gaseous species may persist in the manufactured gas. However, the manufactured gas is substantially composed of hydrogen and some hydrocarbon gases. Lesser quantities of by-product oxide gases from coal and dry solid biomass may be unavoidable, given their origins in the solid starting material. However, cleaner starting materials, such as natural gas, may by and large avoid this by-product oxide gas problem. In any case, the hydrogen content of the manufactured gas created is materially higher than that for the typical coal-based synthetic gas (CO-syngas) and exceeds that of natural gas, the cleanest burning of all fossil fuels.

CO-Syngas is Less Desirable—

Some prior patent disclosures (Santen et al) have sought to produce CO-syngas. CO-syngas contains substantial quantities of carbon-monoxide (CO), e.g., 63% CO, along with lesser quantities of hydrogen gas, where the CO is burned, releasing substantial carbon dioxide ($CO_2$) into the environment. The burning of CO-syngas is less desirable than burning manufactured gas which is substantially composed of hydrogen gas. The disclosed apparatus inventions and method seek to minimize the burning of carbon and CO, and thereby minimize the release and/or sequestering of $CO_2$.

Bed Reactors are Less Desirable—

Bed reactors and burners suffer at least two deficiencies. First, they often do not reach sufficiently high temperatures to fully dissociate and neutralize many undesirable chemical species. Second, they usually employ an oxidizing atmosphere, containing air or an oxygen-enriched (or partially oxygen-depleted) atmosphere, resulting in the undesirable burning of carbon, $CO_2$ release into the environment, or the need for some kind of post-burn $CO_2$ capture, storage, transport and sequestrating. The complete burning of carbon in a bed reactor (or otherwise) is viewed as less desirable than burning manufactured gas substantially composed of hydrogen.

Sequestering of $CO_2$ is Less Desirable—

Sequestering involves the post-burn capture, compression, transport and long-term disposal of carbon dioxide ($CO_2$), for example through deep well injection. There are a number of costs and risks associated with sequestrating $CO_2$. Sequestering is an immature field, and as yet the costs and risks are relatively uncertain. This cost and risk uncertainty may result in an unacceptable outcome for many potential sequestering sites. It is believed that the complete burning of carbon and the post-burn capture, compression, transport and re-sequestering of carbon as $CO_2$ is less desirable than burning manufactured gas which is substantially composed of hydrogen gas. Further, the sequestering of $CO_2$ is likely to be less economical, at least in the short-run and perhaps in the long-term, as well, when all the external environmental risks and consequences are considered. As a result, sequestering may prove to be technically, geologically, socially and/or politically infeasible for a wide range of applications and potential sites. Therefore, locating acceptable long-term, permanent injection sites for the large-scale sequestrating of $CO_2$ may be highly problematical, severely limiting the sites available and the viability or usefulness of sequestering as a potential solution to this $CO_2$ problem.

Starting Materials Discussion

Natural Gas as a Starting Material—

Natural gas is a nearly ideal starting material for the apparatus and method disclosed. It is very dry. So, it requires no drying, while still limiting introduced moisture, and thereby carbon dioxide ($CO_2$) formation. It contains almost no oxygen ($O_2$) and few impurities, limiting other by-product oxide gases. It has a high hydrogen-to-carbon ratio, e.g., Methane or $CH_4$ has a 4:1 H:C ratio, allowing for the production of more hydrogen per kilogram input than from any other starting material. Natural gas may be used as both a carrier gas to create plasmas and as a starting material to produce H-Syngas. The H-Syngas derived from natural gas is a hot, high hydrogen gas mixture which is highly compatible with high-temperature solid oxide fuel cells and combustion turbines. It produces a carbon black or soot as its main solid by-product that has commercial value. Once the H-syngas is appropriately filtered the resulting product burns producing water vapor as its predominant combustion product. The plasma-driven thermal dissociation reaction envisioned separates substantial hydrogen from the unwanted carbon in the natural gas to create the sought after high H:C ratio H-Syngas mixture, e.g., a 6:1, 12:1 or higher H:C ratio gas.

Coal as Starting Material—

Coal consists substanially of carbon, but this is usually mixed with various other chemicals and impurities, including substantial hydrocarbons, water and mineral matter, such as sand and clay. The relative amount of water and these latter impurities affects the usefulness of the coal as a starting material in both a traditional open-cycle furnace and in a plasma reactor. The quality of coal can be determined by its rank and grade. The chemical composition of coal is defined in terms of its proximate and ultimate (elemental) analyses. The parameters of proximate analysis are moisture, volatile matter, ash, and fixed carbon. Elemental or ultimate analysis encompasses the quantitative determination of carbon, hydrogen, nitrogen, sulfur and oxygen within the coal. The disclosed invention and process envision the extraction of manufactured gas substantially containing hydrogen from natural gas, coal and other hydrogen-bearing starting materials, and classifies carbon as a by-product.

Economics and Efficiencies—

It is posited that most, and perhaps all, of the energy disadvantage of manufactured gas, e.g., from not burning carbon, may be offset by other factors. For example, the heat rate of a typical supercritical coal-fired steam electric generator is about 10,000 Btu/kWh. Yet, the heat rate achievable in a gas-fired combined cycle unit (CCU) electric generator can be on the order of 7,000 Btu/kWh, a significant efficiency improvement. Solid coal cannot be burned in a CCU. The PAA and 3D3P Reactor disclosed here could serve a function similar to that of the gasifier in an integrated gasification combined-cycle (IGCC) unit. Further, solid coal is generally not an option for powering fuel cells. But, H-syngas and/or hydrogen derived from H-syngas may be readily consumed in fuel cells. Fuel cell efficiencies cover a broad range up to 80% efficient. In both cases the PAA and pyrolytic reactor avoids the substantial production or the undesirable release of $CO_2$ or the need for extensive and costly $CO_2$ capture, compression, transportation and sequestrating.

The Cost of Carbon Emissions—

Gasified coal (CO-syngas) may be used for some applications. However, it also releases substantial $CO_2$ to the atmosphere or requires massive post-burn $CO_2$ capture, compression, transportation and sequestrating. Assume for the moment that open-cycle carbon emissions are directly taxed and/or incur added indirect costs for $CO_2$ capture, compression, transportation and sequestrating. Then the economic scales tip back toward manufactured H-syngas. Disposing of carbon by sequestrating $CO_2$ can also be very expensive. Using present technology, estimates of sequestering costs are in the range of $100 to $300 per ton of carbon. Further, finding acceptable long-term permanent injection sites for $CO_2$ sequestrating can be highly problematical.

Other Starting Materials—

Other starting materials may also be considered for H-syngas production, including, but not limited to, various forms of biomass, e.g., biofuels, and biomass by-products, such as bio-diesel, and virgin biomass starting materials, e.g., dry saw grass.

What is claimed is:

1. A single-unit plasma array apparatus for the pyrolytic processing of starting materials into a synthetic gas and by-products in a reactor vessel comprising:

a plurality of plasma sources with each of the plurality of plasma sources being configured to produce a flaring plasma jet thereby forming a plurality of plasma sheets,
wherein the plurality of plasma sources are oriented such that the plurality of plasma sheets are arranged in a linear succession forming a fixed three-dimensional reacting region,
wherein the plurality of plasma sources are oriented such that the flaring above a solid by-product collecting region;

a supporting structure removably coupled to the reactor vessel and affixed to the plurality of plasma sources forming a single, unifying plasma array,
wherein the single, unifying plasma array is removably coupled to the reactor vessel as a single unit;

the reactor vessel providing at least one starting material inlet and a coupling surface three-dimensional reacting region created by the single, unifying plasma array and the starting materials are dissociated by the heat supplied by the single, unifying plasma array; and an outlet for removal of the gaseous product.

2. The single-unit plasma array apparatus of claim 1 wherein the gaseous product is composed of at least 50% hydrogen.

3. The single-unit plasma array apparatus of claim 1 wherein the plasma sources comprise using one or more alternative plasma-producing technologies, including, but not limited to, an AC or DC electric non-contact arc-type plasma source, an inductive plasma source, a conductive plasma source, a laser-stimulated plasma source, an electron beam-stimulated plasma source, a microwave-stimulated plasma source or any combination thereof, or any other plasma source or sources employing technologies including, but not limited to, electric, magnetic, neutral particle, electron, ionic, shockwave or electromagnetic means or any combination thereof.

4. The single-unit plasma array apparatus of claim 1 wherein at least one of the plasma sources and at least one of the associated starting material inlets are canted off of a perpendicular through the single-unit plasma array apparatus.

5. The single-unit plasma array apparatus of claim 1 wherein the starting materials are at least natural gas, coal, liquid petroleum products, and biomass containing starting materials including biodiesel and bioethanol, or any combination thereof.

6. The single-unit plasma array apparatus of claim 5 wherein the starting materials have a moisture content of less than 50% moisture content by weight and more preferably less than 15% moisture content by weight and most preferably below 5% moisture content by weight.

7. The single-unit plasma array apparatus of claim 1 further comprising a control system,
wherein the control system changes the operative state of the apparatus as well as manipulates the influx of starting materials and intensity of the plasma sources.

8. The single-unit plasma array apparatus of claim 1 wherein the temperature within the three-dimensional reacting region created by the single, unifying plasma array in the reactor vessel is in the range of about 1000° C. to about 5000° C. and more preferably about 1500° C. to about 2500° C.

9. The single-unit plasma array apparatus of claim 1 wherein the pressure within the reactor vessel is in the range of about 0 to about 100 atmospheres.

10. The single-unit plasma array apparatus of claim 1 wherein the proximity, attraction or repulsion of the three-dimensional reacting region, gaseous products and solid state particulates relative to the vessel wall, is manipulated by the application of an additional electric potential gradient within the reactor vessel using at least one additional direct current power supply.

* * * * *